(12) United States Patent
Chakrabarty et al.

(10) Patent No.: US 11,392,104 B2
(45) Date of Patent: Jul. 19, 2022

(54) SYSTEM AND METHOD FOR FEASIBLY POSITIONING SERVOMOTORS WITH UNMODELED DYNAMICS

(71) Applicant: Mitsubishi Electric Research Laboratories, Inc., Cambridge, MA (US)

(72) Inventors: Ankush Chakrabarty, Cambridge, MA (US); Claus Danielson, Somerville, MA (US); Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/936,747

(22) Filed: Jul. 23, 2020

(65) Prior Publication Data
US 2022/0026871 A1 Jan. 27, 2022

(51) Int. Cl.
*G05B 19/00* (2006.01)
*G05B 19/19* (2006.01)
*G05B 11/42* (2006.01)

(52) U.S. Cl.
CPC .............. *G05B 19/19* (2013.01); *G05B 11/42* (2013.01); *G05B 2219/39219* (2013.01)

(58) Field of Classification Search
CPC .............. G05B 19/19; G05B 11/42; G05B 2219/39219
See application file for complete search history.

(56) References Cited

U.S. PATENT DOCUMENTS

| 4,278,059 | A | * | 7/1981 | Collonia | ............... | F02D 31/002 |
| | | | | | | 123/399 |
| 4,761,595 | A | * | 8/1988 | Goor | ..................... | G05B 19/19 |
| | | | | | | 318/567 |

(Continued)

OTHER PUBLICATIONS

Chakrabarty, Ankush, Claus Danielson, and Yebin Wang. "Data-Driven Optimal Tracking with Constrained Approximate Dynamic Programming for Servomotor Systems." 2020 IEEE Conference on Control Technology and Applications (CCTA). IEEE, 2020. (Year: 2020).*

(Continued)

*Primary Examiner* — Michael D Masinick
(74) *Attorney, Agent, or Firm* — Gennadiy Vinokur; Hironori Tsukamoto

(57) ABSTRACT

A computing system for generating optimal tracking control (TC) policies for controlling a machine to track a given time-varying reference (GTVR) trajectory. An updated augmented state of the machine is obtained. Stored in memory is the GTVR trajectory, a constraint-admissible invariant set (CAIS) of machine states satisfying machine state constraints and a corresponding TC policy mapping a machine state within the CAIS to a control input satisfying control input rate constraints. A processor jointly controls the computing system to control the operation to drive an augmented state of the machine to zero, and update the CAIS and TC policy. Joint control includes using a sequence of control inputs and a sequence of augmented machine states within CAIS corresponding to the sequence of tracking control inputs. Execute a constrained tracking approximate dynamic programming (TADP) using the received data to update the value function, update the CAIS and the corresponding TC policy.

20 Claims, 23 Drawing Sheets

(56) References Cited

U.S. PATENT DOCUMENTS

| | | | | |
|---|---|---|---|---|
| 2013/0190898 | A1* | 7/2013 | Shilpiekandula | G05B 19/19 700/19 |
| 2013/0240329 | A1* | 9/2013 | Brechling | B23Q 7/002 198/676 |
| 2018/0150077 | A1* | 5/2018 | Danielson | G06N 5/003 |
| 2020/0192336 | A1* | 6/2020 | Wang | G05B 19/4184 |
| 2020/0285209 | A1* | 9/2020 | Chakrabarty | G05B 19/045 |
| 2020/0307691 | A1* | 10/2020 | Kalabic | B60W 30/18163 |
| 2021/0003973 | A1* | 1/2021 | Chakrabarty | G06K 9/6256 |

OTHER PUBLICATIONS

Chakrabarty, Ankush, et al. "Approximate dynamic programming for linear systems with state and input constraints." 2019 18th European Control Conference (ECC). IEEE, 2019. (Year: 2019).*

Li, Zhaojian, Uroš Kalabić, and Tianshu Chu. "Safe reinforcement learning: Learning with supervision using a constraint-admissible set." 2018 Annual American Control Conference (ACC). IEEE, 2018. (Year: 2018).*

Falugi, Paola, and David Q. Mayne. "Tracking performance of model predictive control." 2012 IEEE 51st IEEE Conference on Decision and Control (CDC). IEEE, 2012. (Year: 2012).*

Gilbert, Elmer, and Ilya Kolmanovsky. "Nonlineartracking control in the presence of state and control constraints: a generalized reference governor." Automatica 38.12 (2002): 2063-2073. (Year: 2002).*

* cited by examiner

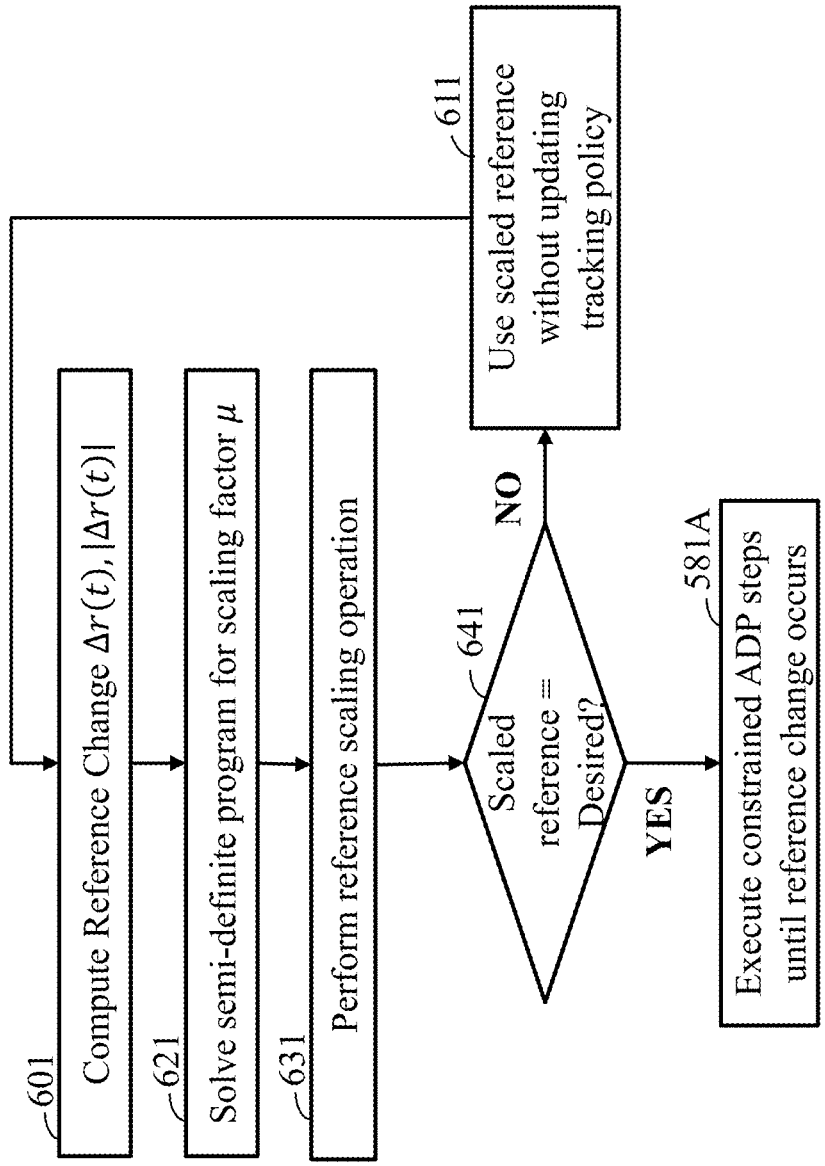

701
Model Based Constrained Tracking ADP

$$\mathcal{P}_{t+1}, \rho_{t+1} = \arg\min_{\mathcal{P}\succ 0, \rho>0} \|\tilde{\mathcal{J}}_t\|$$

s.t.:

$$(A+B\mathcal{F}_t)^\top \mathcal{P}(A+B\mathcal{F}_t) - \lambda\mathcal{P} \preceq 0$$
$$\xi(0)^\top \mathcal{P}\xi(0) \leq \rho$$
$$\rho HH^\top \preceq \mathcal{P}.$$

$$\tilde{\mathcal{J}}_t = (A+B\mathcal{F}_t)^\top \mathcal{P}(A+B\mathcal{F}_t)$$
$$-\mathcal{P} + Q + \mathcal{F}_t^\top R\mathcal{F}_t$$

$$\mathcal{F}_{t+1} = -\left(R+B^\top \mathcal{P}_{t+1}B\right)^{-1} B^\top \mathcal{P}_t$$
$$_{t+1}A$$

702
Data-Driven Constrained Tracking ADP 703

$$\mathcal{P}_{t+1}, \rho_{t+1} = \arg\min_{\mathcal{P}\succ 0, \rho>0} \|\tilde{\mathcal{J}}(t)\| + \gamma_\rho \rho \quad 711$$

s.t.:

$$\xi(t)^\top \mathcal{P}\xi(t) - \lambda\xi(t-1)^\top \mathcal{P}\xi(t-1) \leq 0 \quad 713$$
$$\xi(t-1)^\top \mathcal{P}\xi(t-1) \leq \rho \quad 715$$
$$\rho HH^\top \preceq \mathcal{P}.$$

$$\tilde{\mathcal{J}}(t) = \xi(t)^\top \mathcal{P}\xi(t) - \xi(t-1)^\top \mathcal{P}\xi(t-1) + \sum_{k=0}^{t-1}\tilde{\mathcal{J}}(k) \quad 717$$

704

$$\mathcal{H}_{t+1} = \mathcal{H}_t + \xi(t)\xi(t)^\top \otimes (R+B^\top \mathcal{P}_{t+1}B),$$
$$\varphi_{t+1} = \xi(t) \otimes (R\mathcal{F}_t\xi(t) + B^\top \mathcal{P}_{t+1}\xi(t+1)),$$
$$\text{vec}(\mathcal{F}_{t+1}) = \text{vec}(\mathcal{F}_t) - \beta_t \mathcal{H}_{t+1}^{-1}\varphi_{t+1}$$

FIG. 7A

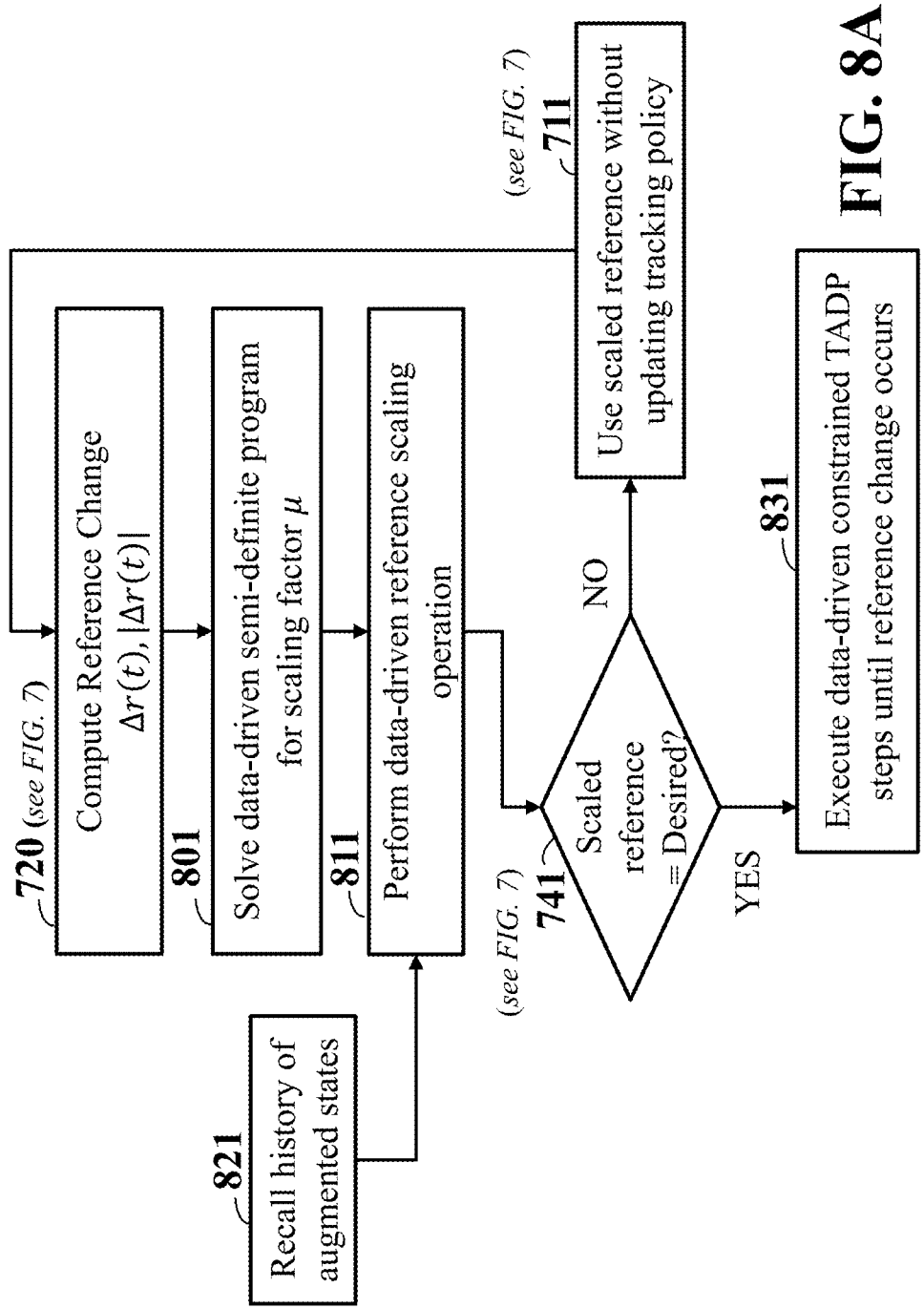

Data-Driven Reference Scaling Continued — 802

$$\mu_{t+1}^{-1} = \arg\max \mu^{-1} \quad (Eq.21a)$$

subject to:

$$\xi_\mu^\top \mathcal{P}_{t+1} \xi_\mu - \lambda \xi(t)^\top \mathcal{P}_{t+1} \xi(t) + (1-\lambda)\rho \leq 0 \quad (Eq.21b) \quad \text{— 804}$$

$$0 \leq \mu^{-1} \leq \|\Delta r(t)\|, \quad (Eq.21c)$$

where $$\xi_\mu = (\mathcal{A} + \mathcal{B}\mathcal{F}_t)\xi(t) + \mathcal{G}_\mu^{-1} \frac{\Delta r(t)}{\|\Delta r(t)\|}$$

$$= \mathcal{A}\xi(t) + \mathcal{B}\Delta u(t) + \mathcal{G}_\mu^{-1} \frac{\Delta r(t)}{\|\Delta r(t)\|}, \quad (Eq.22) \quad \text{— 803}$$

FIG. 8B

TABLE No. 1:
True Servometer Parameters and Constraints

| | | | |
|---|---|---|---|
| $J$ | $7.2 \times 10^{-5}$ | $K_t$ | $0.2723$ |
| $c_0$ | $6.37 \times 10^{-2}$ | $d_0$ | $1.01 \times 10^{-3}$ |
| $\omega_{min}^{feas}$ | $0$ | $\omega_{max}^{feas}$ | $100\pi$ |
| $\alpha_{min}^{feas}$ | $-1.326 \times 10^4$ | $\alpha_{max}^{feas}$ | $1.326 \times 10^4$ |
| $\omega_{min}^{infeas}$ | $0$ | $\omega_{max}^{infeas}$ | $10\pi$ |
| $\alpha_{min}^{infeas}$ | $-1.326 \times 10^3$ | $\alpha_{max}^{infeas}$ | $1.326 \times 10^3$ |

FIG. 9B

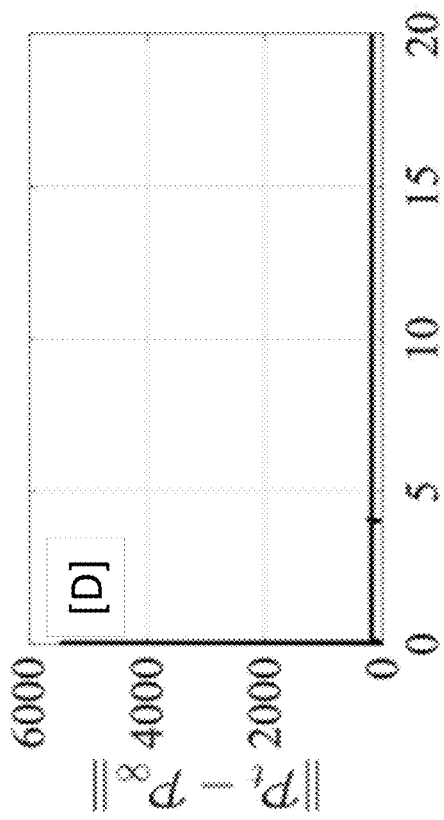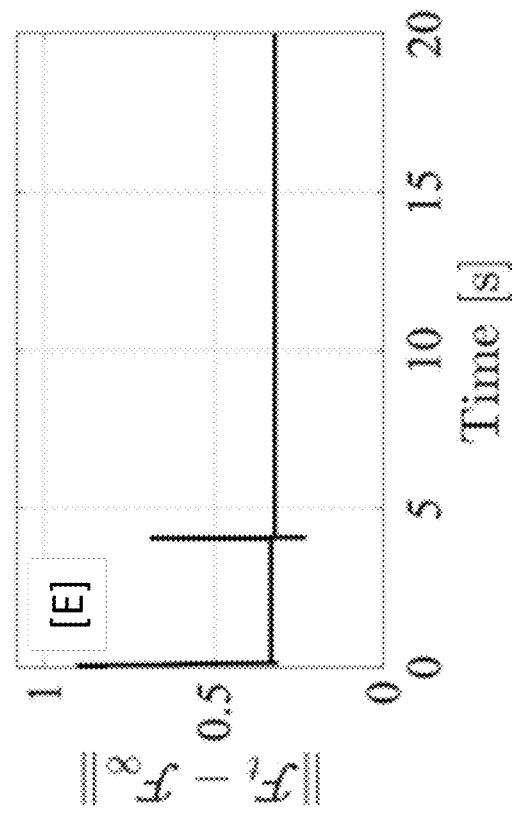
FIG. 10D
FIG. 10E

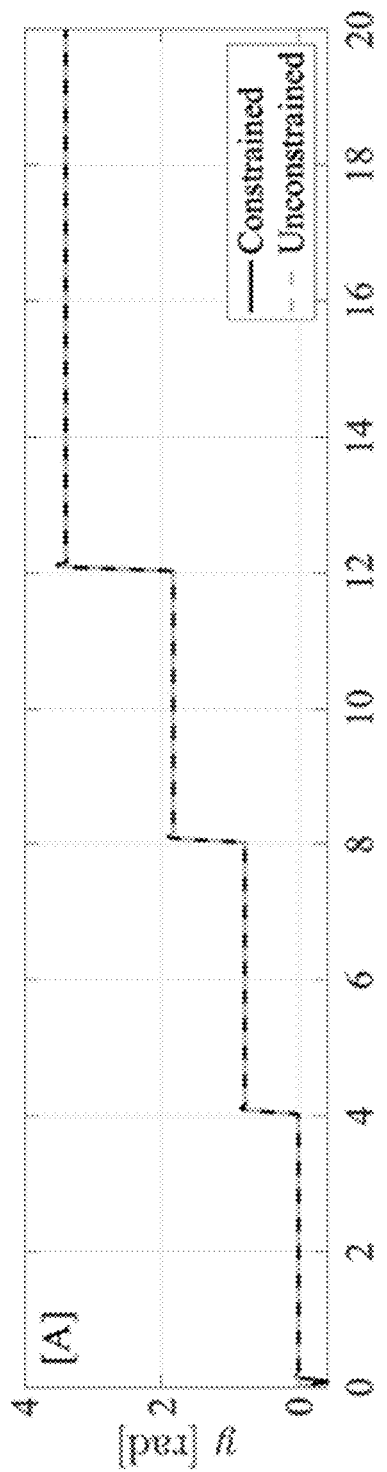
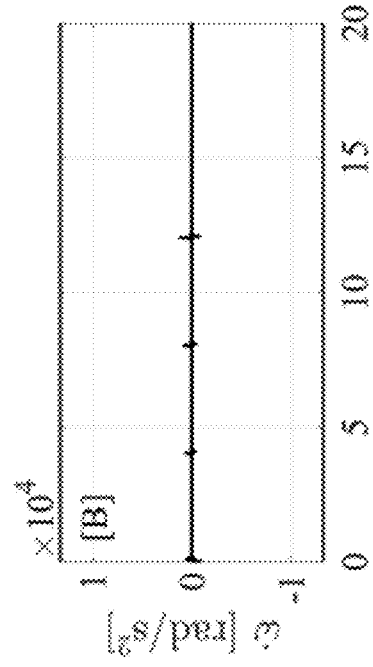
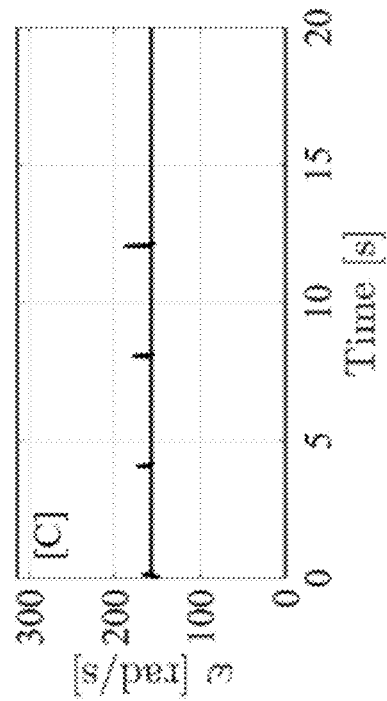
FIG. 11A
FIG. 11B
FIG. 11C

SYSTEM AND METHOD FOR FEASIBLY POSITIONING SERVOMOTORS WITH UNMODELED DYNAMICS

TECHNICAL FIELD

The present disclosure relates generally to system and method for motion control of a machine, and more particularly to a system and a method for data-driven reference generation for constraint satisfaction in machines with closed-loop control systems and uncertain dynamics or parameters.

BACKGROUND

Conventional control systems have been trying to overcome the challenges of controlling dynamical systems in uncertain environments for many different types of applications such as robotics, laser applications, etc. Control theory in control systems engineering is a subfield of mathematics that deals with the control of continuously operating dynamical systems in engineered processes and machines.

Some conventional robust control methods seek to bound the uncertainty, given the bound on the uncertainty, such that the control can deliver results that meet the control system requirements in all cases. Wherein these conventional robust control theories might be stated as a worst-case analysis method rather than a typical case method. However, some problems with this type of conventional approach resulted in reducing performance or sacrificed performance in order to guarantee that the system meets certain requirements. Which is a common theme when dealing with safety critical conventional embedded systems. For example, in a conventional embedded system, computation resources and cost are a significant issue. An issue for a designer of the conventional robust control methods is to synthesize a model that is simple enough to implement within these constraints but performs accurately enough to meet the performance requirements. However, the designer of these conventional robust control methods often fail to develop a model that is insensitive to uncertainty, which causes the conventional robust control methods to fail. Also, these conventional robust control methods bound the uncertainty, and given the bound on the uncertainty, the conventional robust control deliver results meet control system requirements in all cases, however, at a serve loss to performance.

In the absence of accurate models of dynamical systems, some conventional control methods exploit operational data generated by these dynamical systems in order to construct feedback control policies that stabilize the system dynamics, or embed quantifiable control-relevant performance. The use of data to design control policies is called data-driven control. Of which, there are two kinds of data-driven control methods, indirect methods or direct methods. Indirect methods first construct a model of the system and then leverage the model to design controllers. Direct methods directly construct control policies from data without the intermediate model-building step.

At least one drawback of indirect methods, among many drawbacks, is the potential requirement of large quantities of data in the model-building phase. Conversely, direct methods require less data. However, even cutting-edge conventional direct control methods experience problems and difficulties in handling state and input constraints that are imperative for maintaining safe operation in closed-loop control systems.

Accordingly, there is a need for apparatuses, methods and systems to learn optimal tracking policies that is constraint-enforcing without full model knowledge of dynamics of servomotors.

SUMMARY

The present disclosure relates to system control for optimally tracking references in servomotor units having servomotor uncertainties for point-to-point positioning tasks while having constraints on velocity and acceleration. In particular, the present disclosure provides data-driven approximate dynamic programming approaches which learns optimal tracking policies that satisfy control input constraints and induce state trajectories that satisfy state/output constraints without having full model knowledge of dynamics of a servomotor. Wherein the dynamics of the servomotor can include servomotor uncertainties, such that the servomotor uncertainties can be caused by one or a combination of compressibility of fluids, friction forces, and inexact knowledge of the parameters of the underlying system which can result in delays or overshoots performance of tracking references with high precision while using hard operational constraints (velocity and acceleration). Other aspect caused by servomotor uncertainties can be constraint violations, less smooth drill bit motion and aggressive drill bit halting motion, among other aspects.

For example, some embodiments are designed for real-time optimal tracking controllers for servomotor systems engaged in single-axis point-to-point positioning tasks. The reason or reasons why developing this type of design is challenging is due to the presence of unmodeled dynamics, i.e. servomotor uncertainties, along with speed and acceleration constraints. Another reason is that model-based optimal control design methods cannot be applied directly to this uncertain system, i.e. the presence of unmodeled dynamics or servomotor uncertainties. Wherein, some embodiments include a data-driven approximate dynamic programming approach to learn an optimal tracking controller that is constraint-enforcing. Successful experimentation of this method approach is illustrated on a servomotor that positions a head of a laser drilling machine, which results in method success results.

For example, some embodiments include a constrained approximate/adaptive dynamic programming (ADP) algorithm for optimal reference tracking in servomotors for piecewise constant references commonly seen in point-to-point positioning tasks, despite hard constraints on the motor velocity and motor acceleration. This particular method relies on generating an augmented incremental system, whose equilibrium is agnostic to the system's steady-state: such that this at least provides the tracking problem to be cast as a regulation problem, and allows the use of a constrained ADP formalism of which includes some slight modifications. Both a model-based and data-driven version can be used for updating constraint enforcing sets, value functions, and corresponding control policies, when there is no reference change. In such an event of a change in the reference, a reference scaling method akin to reference governors is adapted to adapt the reference, so that the updated state lies within the constraint admissible invariant set associated with the current control policy. At least one aspect is that this allows for constraint satisfaction during reference signal jumps.

Based on results from experimentation, an embodiment was constructed that uses a computing system for generating optimal tracking control (TC) policies for controlling a machine to track a given time-varying reference (GTVR) trajectory. The embodiment or apparatus includes a memory for storing data and program instructions. The stored data can include the GTVR trajectory, a constraint-admissible invariant set (CAIS) of machine states satisfying machine state constraints and a corresponding TC policy mapping a machine state within the CAIS to a control input satisfying control input rate constraints. A transceiver can receive data including an updated augmented state of the machine. Wherein a processor(s) of the computing system can be configured to jointly control the computing system to control the machine operation to drive an augmented state of the machine to zero, and update the CAIS and update the TC policy. Wherein, for executing the joint control, the processor can be configured to control the computing system using a sequence of control inputs generated using the TC policy and a sequence of augmented machine states within the CAIS corresponding to the sequence of tracking control inputs. Then, execute a constrained tracking approximate dynamic programming (TADP) using the received data to update the value function, update the CAIS and the corresponding TC policy. Control of the computing system can be by using the updated TC policy, the updated CAIS and the corresponding updated value function to control the machine to track the GTVR trajectory.

Some practical applications for the apparatuses, systems and methods of the present disclosure can be for factory automation systems. For example, implementation of the present disclosure embodiment would include incorporating the system and methods of the present disclosure into a servomotor control application such as positioning of a drill head for laser drilling. One advantage of this is increased tracking performance of the positioning-system and adherence to safety and operational constraints, which will lead to higher throughput of drilling operations, reduce risk or operational hazard, and reduce costs of manufacturing.

Another application for the embodiments of the present disclosure can be for reconfigurable factories. For example, implementation of the present disclosure embodiment would include a mechanism for learning dynamic behaviors of components in a reconfigurable factory with changing goals or tasks to be completed by these components. One advantage of this is enabling multiple tasks to be completed by one controller architecture and under one holistic hardware/software platform, and adherence to safety and operational constraints, which will lead to greater flexibility of operation and reduce risk or operational hazard.

In the development of the embodiments of the present disclosure many different aspects were tested and some aspects have been included, for example, some aspects can include fusion of data analytics, machine learning and edge intelligence with advanced control technologies which offers improved production efficiency and quality. Wherein the development of edge-based control technologies can take advantage of big data and the computing power of the edge platform to enhance and coordinate with local machines in the factory to provide optimality, adaptation and robustness of the overall production system. Other developments can include data-driven control of self-tuning motion controllers for legacy systems, and designing optimal controllers that adapt to uncertainties and enforce state and input constraints using ADP. Further still, other developments include control on the edge optimal trajectory generation based on the edge optimization based closed loop control over networks. Along with developments of distributed estimation of distributed and collaborative learning for system monitoring and predictive maintenance.

Some properties of control systems that are affected by uncertainty in the modeling of the system dynamics can include stability and tracking. Stability is often phrased as the bounded response of the system to any bounded input. Tracking is often phrased as driving the system response to a bounded region around a trajectory rather than a fixed point. Such that, some embodiments of the present disclosure have overcome the uncertainty challenges by designing control systems that include and maintain all of these properties using limited information.

Still, other embodiments provide stability or provide a bounded response of the system to any bounded input based on data-driven solution of optimal linear-quadratic-tracking problems that are guaranteed to be asymptotically stable.

At least one aspect in developing a control model that controls a computing system for optimizing control policies for controlling a machine to perform a machine operation, includes a control action in an optimum manner without delay or overshoot and ensuring control stability. Another aspect can be to develop a control policy for a computing system that optimizing control policies for controlling the machine to perform a machine operation, by using a control action in an optimum manner without delay or overshoot and ensuring control stability.

Experimentation

The above aspects along with other objectives were used during experimentation for test experiments that included adding adaptation capabilities to legacy systems, i.e. some experimental method approaches of the present disclosure, which was done by replacing an existing controller. However, what was discovered from this test experimental approach revealed some degradation in performance. This degradation is typically due to lack of complete knowledge of the system's underlying dynamics or part thereof, such as a parameter of the system model. This degradation can include: constraint violation during operation, lack of asymptotic tracking abilities, and even instability. Some embodiments of the present disclosure has solved these problems by leveraging operational data in addition to model knowledge to design safe control policies that enforce constraint satisfaction, seek policies close to a linear-quadratic-tracking (LQT) policy that is guaranteed to be stable and demonstrate good tracking performance.

Other aspects of some test experiments included another approach that combined a legacy controller with a data-driven self-tuning module. What was discovered from this test experimentation was that quantifying a closed-loop performance or adding constraints proved to be a critical challenge. Some critical challenges include: updating a control policy with data while ensuring that the updated control policy is control input constraint-admissible and that using this updated control policy maintains a state of the system within desired state-space bounds. Another critical challenge is to search for control policies in a computationally tractable and efficient manner. Some embodiments of the present disclosure have overcome these critical challenges and incorporated solutions to them by leveraging convex programming approaches that are computationally tractable and can be executed efficaciously, and by employing constraint-admissible sets and reference scaling to ensure safety during policy update and operation.

Still, other test experiments included some products having the control housed in the machine tool itself. What was learned from this tested experimentation where that the control was over networks, which was later learned that with such a control architecture revealed a gap between simulation and real world. The gap arises due to incompleteness in the knowledge of the underlying dynamics or the inability to model those dynamics in a straightforward manner. In some test experimentation that included distributed estimation, multiple sensors were deployed to sense a single machine. However, what was later learned in a factory setting, is that most, if not all single machines were limited to only a few sensors, restricting an amount of data i.e. suffered from a lack of global data, required in order to carry out the control architecture.

Some other experimental methods included robust control methods seeking to bound uncertainty, given the bound on the uncertainty, the control delivered results that the control system requirements were met in all cases. However, this approach sacrificed performance in order to guarantee that the system meet certain requirements.

Another experimental approach incorporated reinforcement learning (RL), which is an area of machine learning concerned with how to take actions in an environment so as to maximize some notion of cumulative reward (or equivalently, minimize a cumulative loss/cost). RL is closely related with optimal control in continuous state-input spaces, which is concerned mostly with the existence and characterization of optimal control policies, and algorithms for their computation in the absence of a mathematical model of the controlled system and/or environment.

However, conventional reinforcement learning (RL) methods are not suitable for data-driven control of constrained systems. This is because the conventional RL methods do not consider state and input constraint satisfaction in continuous state-action spaces; that is, conventional RL cannot guarantee that the states of the controlled system operated with control inputs satisfy state and input constraints throughout the operation. A problem of conventional RL is that during an exploration stage, the RL perturbs the system with different inputs to learn the states corresponding to the control inputs. Moreover, to better learn a system, it is beneficial to use control inputs approaching physical boundaries of possible constraints. Because there is no model or partial model knowledge, there is no guarantee that arbitrarily selected control inputs and/or boundary-valued control inputs will not direct the system state to an area outside the specified state/output constraint set, thereby resulting in the violation of state/output constraints.

During experimentation several test experiments included an experimentation apparatus for model-free data-driven control of a machine subject to state and control input constraints, utilizing some principles of reinforcement learning (RL) to guarantee satisfaction of the state constraints in continuous state space of the system and/or to guarantee satisfaction of control input constraints in continuous control input space. Specifically, this particular test approach included a controller using operational data to drive an uncertain system to a fixed equilibrium point while enforcing operational constraints on the states and control inputs, using principles of reinforcement learning, which will be referenced hereafter as "Fixed Equilibrium Point test approach". What was later realized as a challenge to overcome in developing and constructing the embodiments of the present disclosure, is that the Fixed Equilibrium Point test approach tracks a fixed point, however, this test approach does "not" consider a case when the system has to track a time-varying reference trajectory. Further, also what was later realized is that the Fixed Equilibrium Point test approach does "not" consider constraints on the rate of change of the control inputs, which was another challenge to overcome in developing the embodiments of the present disclosure.

However, in order to understand the above realizations, a further explanation of the Fixed Equilibrium Point test approach is provided. For example, the Fixed Equilibrium Point test approach provides for data-driven regulation of dynamical systems with state and input constraints. As well as generates CAIS's from data which change configuration to ensure that the system state remains in an admissible state space, and that any control policy associated with the value function that induces this CAIS satisfies control input constraints. Where the Fixed Equilibrium Point test approach does not require knowledge of the underlying system dynamics other than an initial feasible control policy and its associated CAIS. When the optimal control policy is constraint-admissible, the Fixed Equilibrium Point test approach provides the computation of such an optimal control policy, otherwise it generates a control policy that is as near-optimal as possible without violating constraints.

Some problems and issues later discovered with the Fixed Equilibrium Point test approach is that this test approach does "not" handle the case when there is a time-varying reference that needs to be tracked, as noted above. This is the major difference when compared with the embodiments of the present disclosure, such that extensive test experiments along with further innovation outside that of which can be learned from the theories and understanding gained from the approaches of the Fixed Equilibrium Point test approach. Again, the Fixed Equilibrium Point test approach does "not" consider a case when the system has to track a time-varying reference trajectory, "nor" consider constraints on the rate of change of the control inputs.

In particular, the embodiments of the present disclosure were constructed and developed in order to handle slowly-time-varying reference inputs in two phases: (1) when the reference is constant, using an incremental dynamical system to generate feasible control policies and CAIS's, and (2) when the reference varies, the embodiments of the present disclosure updates the references by using historical/archival data while ensuring that the reference varies feasibly, i.e. without violating constraints.

However upon further testing of the Fixed Equilibrium Point test approach several limitations were discovered including developing an approach that can handle a case when the system dynamics are unknown and the references are time-varying, and the system needs to track these references, which the Fixed Equilibrium Point test approach failed to solve. It was later discovered and realized that this is a much more challenging problem, because this requires knowledge of steady-state equilibria for different references, and a way to adapt references during variation of the reference inputs in such a way as to not violate constraints. These above issues were clearly outside the scope and learning for one to further develop the Fixed Equilibrium Point test approach, and required knowledge not based on the theories or developing reasoning of that of the Fixed Equilibrium Point test approach. Such that, in order to overcome these particular scholarly challenges would require unique and innovative developments that at this particular time are unknown, but would need to be discovered and developed.

Upon several realizations, multiple completed test experiments, along with separate conceptual and processed reasoning, outside that of the Fixed Equilibrium Point test approach, the embodiments were developed and constructed in order to provide for a system and a method for model-free data-driven control of a machine subject to state and control input constraints. Along with extending some principles of reinforcement learning (RL) to guarantee satisfaction of the state constraints in continuous state space of the system and/or to guarantee satisfaction of control input constraints in continuous control input space.

Some of the realizations of the present disclosure include using a combination of constrained adaptive dynamic programming (ADP) and reference adaptation to compute optimal & feasible policies, where the reference signal is known and piece-wise constant, which is common in many servomotor applications such as laser drilling. Another realization is that to apply ADP to the servomotor problem, we need to transform the reference tracking problem into a regulation problem, due to not being able to mathematically address the presence of unmodeled dynamics (system uncertainties), along with speed and acceleration constraints. Transform the reference tracking problem by generating an augmented incremental system, whose equilibrium is agnostic to the system's steady-state (i.e. design a control policy that drives the system state as close as possible to the desired state while minimizing an infinite-horizon cost function, so that the control satisfies constraints): this enables the tracking problem to be cast as a regulation problem and allows for the use of the constrained ADP formalism with slight modifications. Wherein, this allows for posing a semidefinite program that can be solved online using standard convex programming methods, both in a model-based and data-driven approaches: (1) No reference change: update constraint enforcing sets, value functions, and corresponding control policies for model-based and data-driven version, when there is no reference change; and (2) Reference change: to achieve constraint satisfaction during reference signal jumps, adopt a reference scaling method, i.e. reference governors, to adapt the reference so that the updated state lies within the constraint admissible invariant set associated with the current control policy.

At least one recognition of the present disclosure is that a control problem for controlling an operation of a machine subject to state constraints in continuous state space of the machine and subject to control input constraints in continuous control input space of the machine can be formulated as a control problem of a machine having a state within a constraint admissible invariant set (CAIS) of the states of the machine satisfying the state constraints. The CAIS is coupled to, or associated with, a corresponding control policy that guarantees that when a machine is in the CAIS and is controlled according to this control policy, the state of the machine is maintained with the CAIS, and therefore, such a control always satisfies the constraints. However, the CAIS is usually determined based on a model of the machine, and based on our knowledge there is no method that can determine CAIS based on data obtained online by observing operations of the machine.

Some embodiments are based on recognition that if a state of a machine is in any arbitrarily and suboptimal CAIS associated with any arbitrarily suboptimal control policy and that arbitrarily and suboptimal CAIS satisfies the state constraints, it is safe to control the machine with this suboptimal control policy without the danger of violating the constraints. Some embodiments are based on realization that the data collected during such suboptimal control can be used to improve suboptimal CAIS and suboptimal control policy. Moreover, some embodiments are based on realization supported by experiments and mathematical prove that iterative update of such suboptimal, but safe control using some RL principles will asymptotically converge to an optimal control policy for control of a constrained machine without violating the constraints of the machine and without the need for knowledge of a dynamical model of the machine.

Specifically, some embodiments are based on recognition that value function and control policy update of RL methods for linear machines includes iterative solution via a policy and/or value iteration method. Such a solution can be used to update the value function estimate and improve the control policy using data collected during control of a machine. In addition, some embodiments are based on realization that such a policy iteration can be modified based on constraints on the controlled machine to require the solution of an optimization problem related to the controlled performance of the machine to satisfy the constraints on the states and control inputs. The policy iteration subject to constraints is referred herein as constrained policy iteration. That constrained policy iteration can also be solved iteratively using data collected during a safe control with suboptimal control policy associated with suboptimal CAIS and the solution of the constrained policy iteration can also be used to improve the suboptimal CAIS and the suboptimal control policy. The improved control policy and improved CAIS can further be used for safe control of the machine and the data collected from that improved control can further improve the control policy and the CAIS. As a result, iterative control of the machine with suboptimal control policy associated with suboptimal CAIS and update of the suboptimal control policy and suboptimal CAIS based on the collected data by solving the constrained policy iteration ultimately produces the optimal control policy and optimal CAIS in a guaranteed safe manner.

To that end, some embodiments, starting with suboptimal CAIS and control policy, jointly control the machine and update the CAIS and the control policy. For example, for performing the joint control and update, some embodiments control the machine using the control policy to collect data including a sequence of control inputs generated using the control policy and a sequence of states of the machine within the CAIS corresponding to the sequence of control inputs, and update the CAIS, the value function, and the control policy by solving a constrained policy iteration using the collected data. The constraints on the policy iteration are functions of the state constraints and the control input constraints.

One embodiment is configured to repeat the joint control and update until a termination condition is met. Example of terminal condition can be the end of the control. Further, at least one embodiment upon reaching a termination condition produces an optimal control policy, and after that controls the machine using the optimal control policy.

According to an embodiment of the present disclosure, an apparatus having a computing system for generating optimal tracking control (TC) policies for controlling a machine to track a given time-varying reference (GTVR) trajectory. The apparatus including a memory for storing data and program instructions. The data includes the GTVR trajectory, a constraint-admissible invariant set (CAIS) of machine states satisfying machine state constraints and a corresponding TC policy mapping a machine state within the CAIS to a control input satisfying control input rate constraints. A transceiver to receive data including an updated augmented state of the machine. A processor of the computing system is configured to jointly control the computing system to control the machine operation to drive an augmented state of the machine to zero, and update the CAIS and update the TC policy. Wherein, for executing the joint control, the processor is configured to control the computing system using a sequence of control inputs generated using the TC policy and a sequence of augmented machine states within the CAIS corresponding to the sequence of tracking control inputs. Execute a constrained tracking approximate dynamic programming (TADP) using the received data to update the value function, update the CAIS and the corresponding TC policy. Control the computing system using the updated TC policy, the updated CAIS and the corresponding updated value function to control the machine to track the GTVR trajectory.

According to another embodiment of the present disclosure, a computing system for generating optimal tracking control (TC) policies for controlling a machine to track a given time-varying reference (GTVR) trajectory. The computing system includes a memory for storing data and program instructions. The data includes the GTVR trajectory, a constraint-admissible invariant set (CAIS) of machine states satisfying machine state constraints and a corresponding TC policy mapping a machine state within the CAIS to a control input satisfying control input rate constraints. A transceiver to receive data including an updated augmented state of the machine. A processor of the computing system is configured to jointly control the computing system to control the machine operation to drive an augmented state of the machine to zero, and update the CAIS and the TC policy. Wherein, for executing the joint control, the processor is configured to control the computing system using a sequence of control inputs generated using the TC policy and a sequence of augmented machine states within the CAIS corresponding to the sequence of tracking control inputs. Execute a constrained tracking approximate dynamic programming (TADP) using the received data to update the value function, update the CAIS and the corresponding TC policy. Control the computing system using the updated TC policy, the updated CAIS and the corresponding updated value function to control the machine to track the GTVR trajectory.

Another embodiment of the present disclosure a method having a computing system for generating optimal tracking control (TC) policies for controlling a machine to track a given time-varying reference (GTVR) trajectory. The method including storing data and program instructions in a memory. The data includes the GTVR trajectory, a constraint-admissible invariant set (CAIS) of machine states satisfying machine state constraints and a corresponding TC policy mapping a machine state within the CAIS to a control input satisfying control input rate constraints. Receiving data via a transceiver, the data including an updated augmented state of the machine. Using a processor of the computing system to jointly control the computing system to control the machine operation to drive an augmented state of the machine to zero, and update the CAIS and the TC policy. Wherein, for executing the joint control, the processor is configured for controlling the computing system using a sequence of control inputs generated using the TC policy and a sequence of augmented machine states within the CAIS corresponding to the sequence of tracking control inputs. Executing a constrained tracking approximate dynamic programming (TADP) using the received data to update the value function, update the CAIS and the corresponding TC policy. Control the computing system using the updated TC policy, the updated CAIS and the corresponding updated value function to control the machine to track the GTVR trajectory.

Another embodiment of the present disclosure an apparatus having a computing system for generating optimal tracking control (TC) policies for controlling a servomotor to track a given time-varying reference (GTVR) trajectory. The apparatus including a memory for storing data and program instructions. The data includes the GTVR trajectory, a constraint-admissible invariant set (CAIS) of servomotor states and tracking errors, the CAIS satisfies servomotor state constraints and a corresponding control policy mapping a servomotor state within the CAIS to a control input satisfying control input constraints. Wherein a control of the computing system to control an augmented servomotor state within the CAIS according to the corresponding TC policy maintains the augmented servomotor within the CAIS, while tracking the GTVR trajectory. A transceiver to receive data including an updated augmented state of the servomotor that includes a difference between updated states of the servomotor and states of the servomotor and the tracking error from the memory. A processor of the computing system is configured to jointly control the computing system to control the servomotor operation to drive an augmented state of the servomotor to zero, update the CAIS and the TC policy. Wherein, for executing the joint control, the processor is configured to control the computing system using the including a sequence of control inputs generated using the TC policy and a sequence of augmented servomotor states within the CAIS corresponding to the sequence of tracking control inputs. Execute a constrained tracking approximate dynamic programming (TADP) using the received data to update the value function, update the CAIS and the corresponding TC policy. Wherein, to execute the constrained TADP, the processor is configured to execute a constrained policy evaluation to produce an updated CAIS and a corresponding updated value function of an augmented servomotor state. Wherein the updated value function improves a tracking cost function of the operation of the servomotor and the updated CAIS enforces satisfaction of the augmented servomotor state and incremental control input constraints, for the GTVR trajectory. Execute a constrained policy improvement to generate an updated TC policy that improves the tracking cost function of the servomotor operation according to the updated CAIS and the corresponding updated value function, for the GTVR trajectory. Execute a reference scaling operation that employs the stored data to generate a modified reference trajectory. Wherein the modified reference trajectory is a reformulation of the given reference trajectory to avoid constraint violation at time instants where the given reference trajectory exhibits jump discontinuities. Control the computing system using the updated TC policy and the updated CAIS and the corresponding updated value function to control the servomotor to track the GTVR trajectory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6 is a block diagram illustrating a flowchart of some steps of a model-based version of the constrained TADP algorithm when the desired reference command signal changes, according to some embodiments of the present disclosure;

FIG. 7A illustrates the transformation of the model-based version of the constrained TADP algorithm into a data-driven form when the desired reference command signal is constant, i.e. a method to transform the model-based constrained TADP and reference scaling method into a data-driven formulation, according to some embodiments of the present disclosure;

FIG. 8A is a block diagram illustrating a flowchart of the data-driven constrained TADP algorithm when the desired reference command signal changes, according to some embodiments of the present disclosure;

FIG. 8B is illustrating some equations for the data-driven constrained TADP algorithm of FIG. 8A, when the desired reference command signal changes, according to some embodiments of the present disclosure;

FIG. 9B is a table illustrating true servometer parameters and constraints, according to some embodiments of the present disclosure;

FIG. 10D illustrates an evolution of normed error in a $\mathcal{P}$ matrix, according to some embodiments of the present disclosure;

FIG. 10E illustrates Evolution of normed error in the $\mathcal{F}$ matrix, according to some embodiments of the present disclosure;

FIG. 11A describes a point-to-point positioning task required during laser drilling operation using servomotor controlled laser drills, i.e. position in radians for the unconstrained and constrained ADP for a problem where the optimal tracking controller is "feasible", according to some embodiments of the present disclosure;

FIG. 11B and FIG. 11C illustrate a scenario where the constrained TADP is executed on the drilling task, and the constraints are such that the optimal TADP controller is constraint-feasible, in particular, illustrated is the angular velocity and acceleration with hard constraints for the servomotor driven by unconstrained (dashed line) of FIG. 11B, and constrained ADP (black continuous line) of FIG. 11C, according to some embodiments of the present disclosure.

DETAILED DESCRIPTION

The present disclosure relates to data-driven approximate dynamic programming approaches to learn optimal tracking policies that are constraint-enforcing without full model knowledge of dynamics of servomotors.

Some embodiments provide a system and a method for controlling an operation of a machine using a data-driven state feedback optimal tracking controller.

Some embodiments provide such a controller that is suitable for controlling a machine subject to constraints. An example of such a data-driven optimal controller uses constrained tracking approximate dynamic programming (TADP) to determine constrained control policies based on data obtained during the operation of the controlled machine. The TADP based adaptive control performs iteratively. For simplicity of presentation, this disclosure discusses methodology within one iteration, which can be repeated as long as necessary for the control application. A number of iterations may be different upon a specific user goals.

Figure 1A:
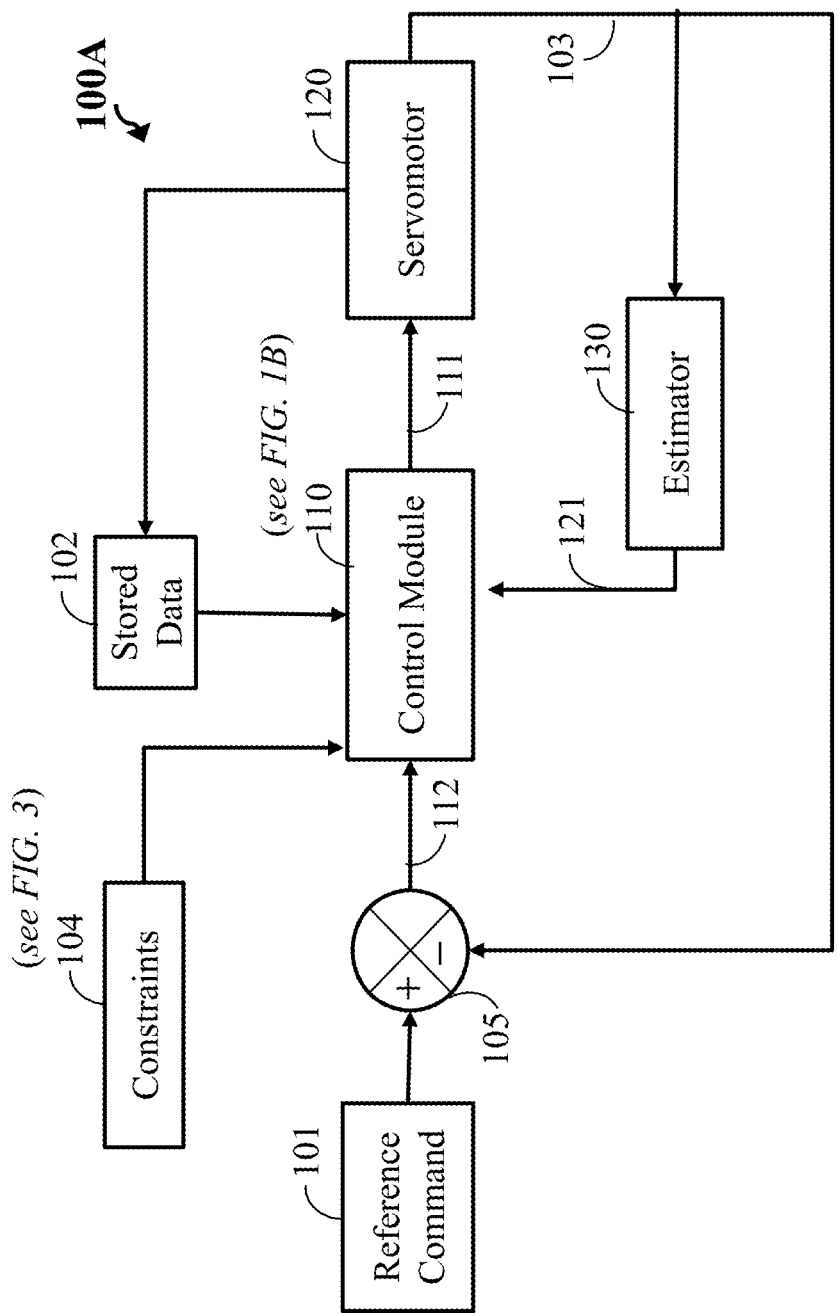
FIG. 1A is a block diagram illustrating a data-driven, constrained, optimal tracking control scheme and feedback system for a servomotor machine, according to an embodiment of the present disclosure.

FIG. 1A shows an example of a controlled machine, such as a servomotor machine 120, controlled using a control module 110 according to some embodiments. In some implementations, the control module uses a reinforcement learning methodology that performs tracking approximate dynamic programming according to stored data 102 obtained during the operation of the machine 120, i.e. servomotor(s). The controller includes an input interface to accept the stored data 102 indicative of the state of the machine. Examples of the input interface includes network control interface configured to accept data transmitted thorough wired or wireless communication channel. The stored data 102 can include state 121, output 103, control input 111, future desired reference trajectory commands 101, and or prior/current output error 112, obtained at the current time or stored from previous times, as well as previous and current constraint-admissible invariant set (CAIS) with previous and current tracking control policy.

The state 121 can include the measurements 103 as well as transformations of the measurements performed by a state-estimator 130. Examples of state estimator includes: the identity function I(x)=x, in systems when the full-state feedback is available, or approximate differentiators with low-pass filters to estimate the derivatives of the output, from which a state estimate can be obtained for systems where the states are derivatives of the output; as an example, consider an output of system position, where states are positions, velocities, and acceleration (derivatives of position).

The servomotor machine and control system is designed to satisfy constraints 104 that arise from safety considerations, physical limitations, and/or specifications, limiting the range where the outputs, the inputs, and also possibly the states of the servomotor are allowed to operate. The constraints 104 are defined in continuous space. For example, state constraints are defined in continuous state space of the servomotor and control input constraints are defined in continuous control input space.

During the operation, the controller receives a reference command 101 indicating the desired behavior of the servomotor. The reference command 101 can include, for example, a value of the desired torque generated by the servomotor. In some embodiment, the reference command 101 is a value of desired position that servomotor needs to move. Comparison 105 between the reference command 101 and measured signal 103 produces an error signal 112, which is an input to control module 110. In response to receiving the command 101, the controller generates a control signal 111 that serves as a control input for the servomotor 120. In response to the input 111, the machine updates the output 103 of the servomotor. Based on measurements of the output 103 of the machine, the estimator 130 updates the estimated state 121 of the servomotor. This estimated state 121 of the servomotor provides the state-feedback to the controller 110.

The servomotor 120, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine 120 can be modeled by a set of equations representing changes of the output over time as functions of current and previous inputs and previous outputs. During the operation, the machine can be defined by a state of the servomotor. The state of the servomotor is any set of information, in general time varying, that together with the model and future inputs, can be used to predict future motion. For example, the state of the servomotor can include an appropriate subset of current and past inputs and outputs.

The controller 110 can be implemented in hardware or as a software program executed in a processor, e.g., a microprocessor, which at fixed or variable control period sampling intervals receives the estimated state 121 of the machine 120 and the desired motion command 101 and determines, using this information, the inputs, e.g., the control signal 111, for operating the machine. The estimator 130 can be implemented in hardware or as a software program executed in a processor, either the same or a different processor from the controller 110, which at fixed or variable control period sampling intervals receives the outputs 103 of the machine and determines, using the new and the previous output measurements, the estimated state 121 of the machine.

For example, the components of the embodiments of the present disclosure can be utilized in order for a drilling head to first move atop of a location of a hole of a workpiece, where the drill head stands still, and then a laser beam can be fired to melt material and drill a hole in the workpiece. Specifically, the components need to direct the motion of the drill to attain the correct sequence of cuts, along with a corresponding reference to be tracked to make the holes (without returning to the origin). Since the drilling head has to stop at the hole, the movement of the drilling head for drilling a series of holes can be decomposed into a number of point to point single-axis positioning tasks. Thus, when the optimal tracking control policy is feasible, and when the constrained ADP is expected to converge to the optimal policy, the constrained ADP has a smoother, less aggressive halting motion when compared with the optimal tracking controller.

Figure 1B:
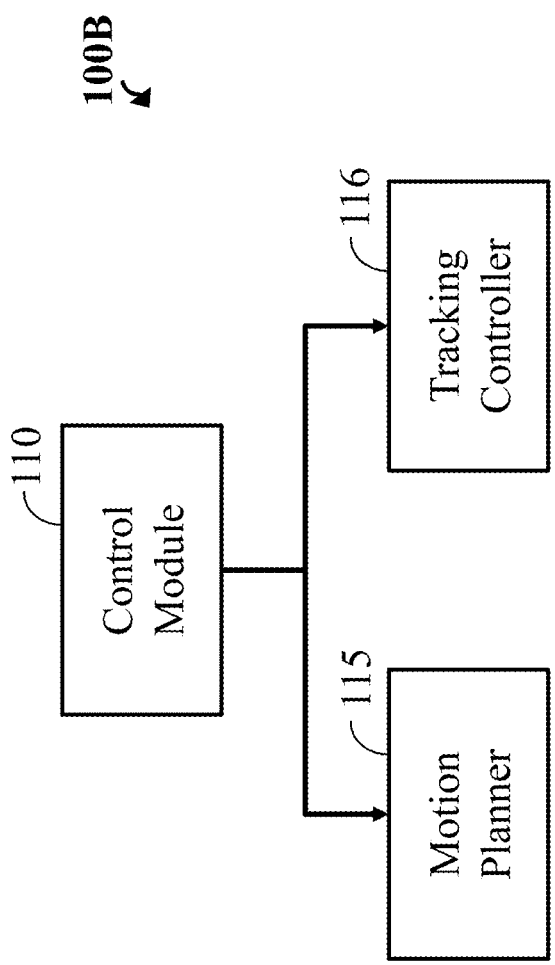
FIG. 1B is a schematic illustrating some components of the control module required for optimal tracking, according to some embodiments of the present disclosure.

FIG. 1B describes the components of the control module 110. For optimal tracking under constraints, a motion planner 115 typically generates feasible reference trajectories that are close to (and when possible, equal to) the desired reference command 101. The second component of the control module 110 is the tracking controller 116 that controls the state of the servomotor 120 to the feasible trajectory generated by the motion planner 115. In one embodiment of this present disclosure, the motion planning and tracking control are concurrently generated by the constrained TADP algorithm.

Figure 1C:
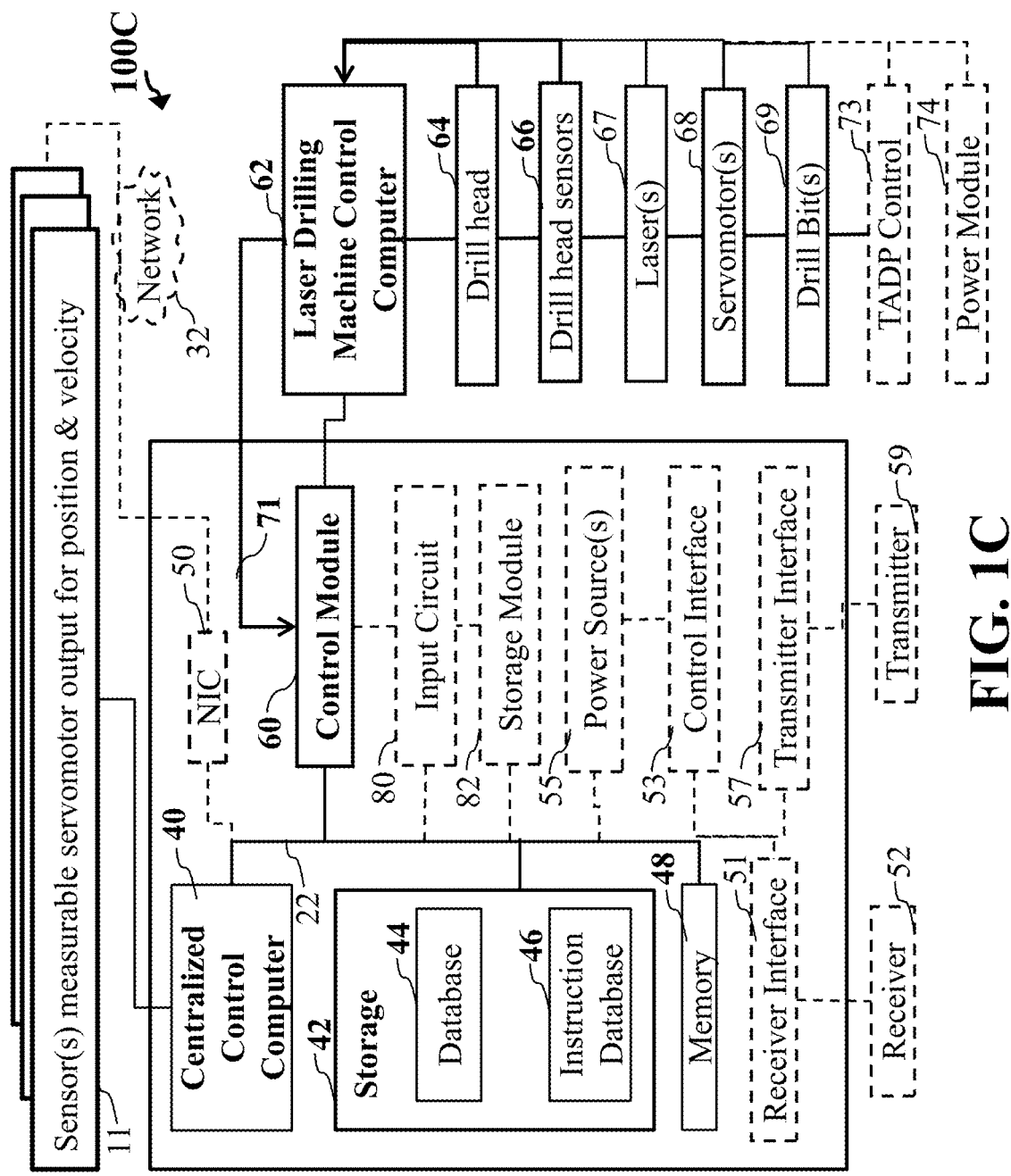
FIG. 1C is a schematic illustrating some components for a centralized controller system of the method of FIG. 1A, according to some embodiments of the present disclosure.

FIG. 1C is a schematic illustrating some components for a laser drilling machine centralized controller system of the method of FIG. 1A, according to some embodiments of the present disclosure. For example, a centralized control computer 40 can be located within a laser drilling machine (not shown), in a cloud-based system or a system running a supervisory control layer. The centralized control computer 40 can be connected to sensors (not shown) located within an environment (not shown) and positioned within a sensing distance of a workpiece (not shown) to be moved by the centralized control computer 40. The sensors (not shown) can be cameras, video cameras, speed sensors, light sensors, environmental related sensors (i.e. temperature, humidity, fire, air, water, barometer sensors, etc.), used with the laser drilling machine. The sensors (not shown) can be hardwired and/or wireless, such that a network 32 can be within an operating distance range of the sensors 30.

The centralized control computer 40 is connected to a bus system 22 that connects to storage 42. The storage 42 can include a database 44, an instruction database 46, a historical database (not shown), an instruction historical database (not shown), an environmental database (not shown), a human worker database (not shown) where worker data is associated with the operation of the machine (i.e. servomotor(s), other databases (not shown) can have data related to operation and information usable by the laser drilling machine (not shown). Where the database 44 can include input/output state, reference input, reference trajectories (i.e. coordinates the laser is going to cut, etc.), model parameters (i.e. friction coefficients, viscosity coefficients, etc.). Again, depending upon each user/operator's specific operational configurations/structure/special needs/sensitivities of the intended use of the laser drilling machine, many different configurations are contemplated.

Still referring to FIG. 1C, a memory 48 is connected to the bus system 22, along with a receiver interface(s) 51, a receiver(s) 52 and a power source(s) 55. The power source(s) 55 can be connected to the bus system 22, connected to a control interface 53, or be configure to have a multitude of other configurations, all of which, is contemplated depending on the specific user/operator intended specific needs for operations. It is possible the power source(s) can be electric, renewable energy sources, chemical, as well as directly connected to the laser drilling machine (not shown), have a multiple external power sources of different types, or both. A transmitter interface(s) 57 and transmitter(s) 59 are connected to the bus system 22. Also, a network interface controller 50 (NIC, also known as a network interface card, network adapter, LAN adapter or physical network interface, and by similar terms, is a computer hardware component connecting a computer to a computer network) is connected to the bus system 22 and can be in communication with a network 32 or other different types of wireless networks (not shown). Again, depending upon the special needs for operation & sensitives needed by a user/operator for their intended use.

A control module(s) 60 can be connected to the bus system 22. The control module(s) 60 can be connected to a laser drilling control computer(s) 62, that assists in directing components of the laser drilling control computer 62. Some components can include, by non-limiting example, one or more drill heads 64, drill head sensors 66, one or more lasers 67, one or more servomotors 68, one or more drill bits 69, and other related components (not shown), which all can be connected to the laser drilling control computer(s) 62, and/or the control module 60, via 71. The control Module 60 can be configured from laser drilling control computer 62 to regulate input currents/torques to the servomotor, and report back, thereby providing the current servomotor state. Contemplated is that the laser drilling control computer can have a power module 74, that can include any power source that provides power to the robotic system such as a power adaptor or a rechargeable battery pack depending on the user specific requirements. Wherein the TADP 73 can be positioned in laser drilling machine control computer or control module 60.

Still referring to FIG. 1C, the centralized control computer 40 can implement or execute stored instructions that are stored in memory 48, storage 42 or access from a cloud storage via the network 32, in particular, the centralized control computer 40 can access the prestored data including data from the database 44, the instruction database 46, or other stored data from other databases (not shown), as noted above.

Figure 9A:
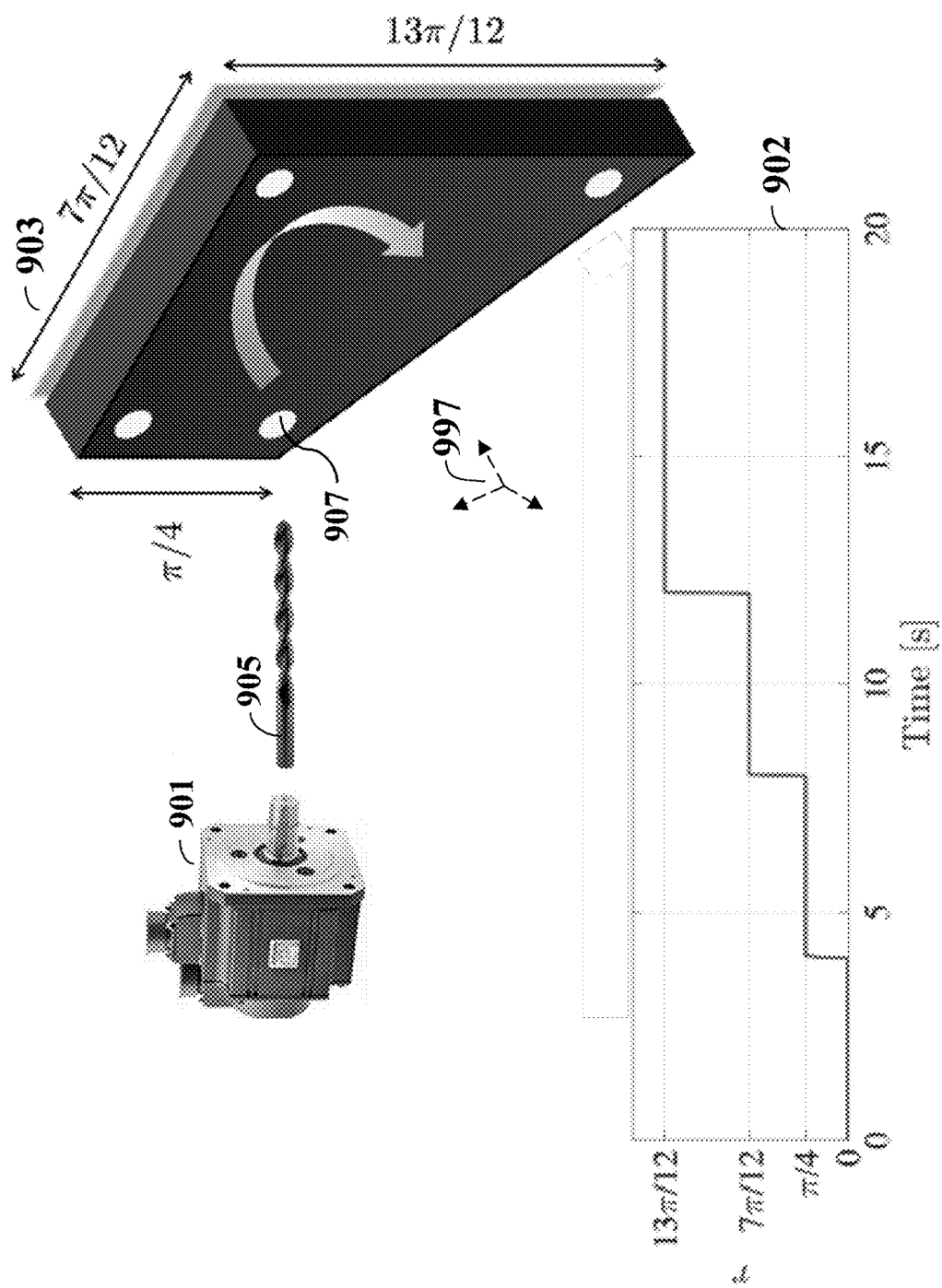
FIG. 9A is a schematic illustrating a drilling task and stroke lengths required as a reference input for a lazer drilling machine having a drill bit and a workpiece, according to some embodiments of the present disclosure.

Still referring to FIG. 1C, the laser drilling control computer 62 can command the drill head to move long an X axis, Y axis or Z axis 997 of FIG. 9A, or some other action command. Contemplated is that the centralized controller system 100C can include a TADP control 73 connected to the component sensors (i.e. sensors associated with the drill head, laser, servomotor(s), drill bit(s) or any other components of the laser drilling machine or associated with the laser drilling machine), and other components (not shown). Contemplated is that multiple types of sensors can be located on or in an approximate area of the laser drilling machine.

The TADP is a constrained tracking approximate dynamic programming (TADP) that can determine constrained control policies based on data obtained during the operation of the controlled machine. Wherein, the TADP control 73 can include a sensor hardware processor (not shown) connected to a sensor memory (not shown) that includes stored software (not shown) and pre-learned XY sets database that includes labels and surface force values. The sensor hardware processor (not shown) can implement or execute stored instructions that are stored in the sensor memory (not shown), and when any sensor data is received, the received data can be compared to stored data and sensor stored data, and send sensor data/signals, such as warning messages associated with any of the components or associated components of the laser drilling machine, etc., to the laser drilling control computer 62 or other components of the system 100C. Another aspect of the systems and components of the present embodiments, is that software or hardware, or some combination thereof, can be implemented via localized storage or through a cloud-based system.

Further, the control or controller module 60 can include different applications and programs for implementing methods of the present disclosure. For example, the control module 60 can include applications for processing information received from the laser drilling control computer 62, such as generating graphs, operation related models including 3D models of the environment where the system is located as well as a specific type of model. The control module 60 can include applications for interpreting control inputs, or input signals, received via the input circuit/interface module 80, storage module 82, and generating commands/actions at the laser drilling control computer 62. For example, some aspects of the system can include types of control methods relating to synthetic tracking and constraint satisfaction of velocity and acceleration of the drill head, in combination related control of the other laser drilling components with the workpiece or other structures, collision detection and avoidance, compliance control, etc.

Figure 2:
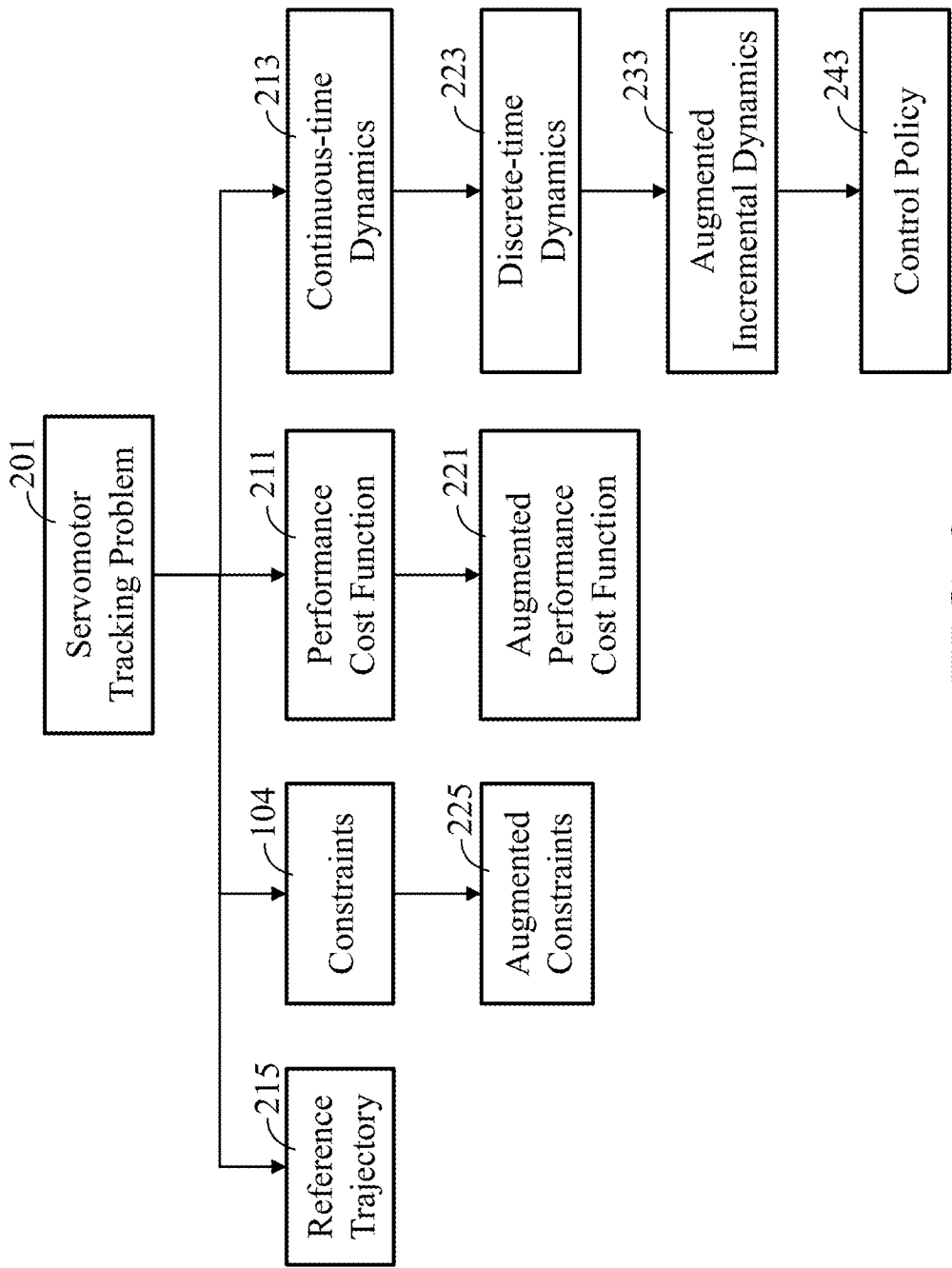
FIG. 2 is a block diagram illustrating some stages of transformation of the original servomotor optimal tracking problem to a form with which constrained tracking approximate dynamic programming (TADP) can be performed, according to some embodiments of the present disclosure.

FIG. 2 describes the overall tracking problem 201 for a servomotor performing point-to-point positioning tasks in a single-axis. Some embodiments consider a dynamical model of a servomotor machine given by the continuous-time dynamics 213

$$J\ddot{\theta} = -d_0\dot{\theta} - c_0 \operatorname{sgn} \dot{\theta} + K_t u$$

where $\theta$ is the angular position of the servomotor, $\dot{\theta}$ is the angular velocity, u is the controlled current, J is the lumped inertia of the servomotor and a load, $c_0$ is the amplitude of the Coulomb friction force, $d_0$ is the viscous friction coefficient, and $K_t$ is the torque constant. According to some embodiments, the state of the servomotor is the angular position and the angular velocity.

Still referring to FIG. 2, in one embodiment, the continuous-time dynamics 213 are converted to discrete-time dynamics 223 using forward Euler discretization with a fixed sampling time τ, leading to a discrete-time state-space representation $$\theta(t+1)=\theta(t)+\tau\omega(t)$$

$$\omega(t+1)=d\omega(t)+bu(t)-c$$

where $x(t)=[\theta\ \omega]^T$ is the state of the servomotor 120 of FIG. 1A with initial conditions $(\theta_0, \omega_0)$, and the parameters are $d=1-\tau d_0/J$, $c=\tau c_0/J$, and $b=\tau K_t/J$. A compact representation of the discrete time dynamics is given by $$x(t+1)=Ax(t)+Bu(t)+W,\ e(t)=Cx(t)-r(t)$$

where $$A = \begin{bmatrix} 1 & \tau \\ 0 & d \end{bmatrix},$$

$$B = \begin{bmatrix} 0 \\ b \end{bmatrix},$$

C=[1 0], and $$W = \begin{bmatrix} 0 \\ -c \end{bmatrix}.$$

Here, r(t) is the desired servomotor reference command input 101, Cx(t) is the servomotor output position to be tracked 120 of FIG. 1A, and e(t) is the output tracking error 112 of FIG. 1A at the current time. The matrices B and C are known at design time, and the matrix A is possibly unknown. The past and current state or estimate of the state is always available at the current time, and the pair (A,B) though unknown, is stabilizable, this condition is necessary for a controller to exist. One can typically find the torque constant and the inertia of the motor based on the motor specifications. No knowledge of the viscous or Coulomb frictions is assumed, since these parameters are more difficult to ascertain, especially with high precision. In one embodiment, encoders are used to obtain the position of the servomotor and estimate the speed from consecutive measurements or via estimators.

Still referring to FIG. 2, according to some embodiments, the reference input trajectory 101 of FIG. 1A, is piecewise-constant and the entire trajectory r(•) is known for time t≥0. In other embodiments, the reference input trajectory has near-zero higher-order derivatives.

In some embodiments, we enforce that the servomotor always rotates in the same direction, thus $\dot\theta \geq 0$. In some embodiments, we perform tracking of multiple servomotors by considering each axis separately and performing constrained TADP on each axis as described herein.

Still referring to FIG. 2, given a target output position r(t), we will design a control policy that drives the system state x(t) as close as possible to the desired state [r(t), 0] while minimizing an infinite-horizon performance cost functional 311 $V_\infty = \Sigma_0^\infty V(t)$ where $$V_t = \|Cx(t)-r(t)\|_S^2 + \|x(t)-x(t-1)\|_Q^2 + \|u(t)-u(t-1)\|_R^2$$

while enforcing the constraints 204. These constraints 204 include both state and output-based constraint 302 as well as input constraints 303.

Still referring to FIG. 2, ADP is a framework most commonly used for synthesizing regulators when complete model information is unavailable or when obtaining exact solutions to an optimal control problem is computationally intractable, making it an attractive method for servomotor control. However, since we are trying to control the servomotor for reference tracking, we need to first transform our tracking problem into a regulation problem. This is accomplished using an augmented incremental form of the dynamics 333 given by $$\xi(t+1) = \mathcal{A}\xi(t) + \mathcal{B}\Delta u(t) + \mathcal{G}\Delta r(t)$$

where $$\xi(t)=[x(t)-x(t-1),\ e(t)]$$

and $$\mathcal{A} = \begin{bmatrix} A & 0 \\ C & I \end{bmatrix},$$

$$\mathcal{B} = \begin{bmatrix} B \\ 0 \end{bmatrix},$$

$$\mathcal{G} = \begin{bmatrix} 0 \\ -I \end{bmatrix}.$$

Since the reference trajectory 215 is piecewise constant, Δr(t) is mostly zero, but at some instants of time, can be non-zero. These instants of time are where the reference trajectory 'jumps'. The Coulomb friction c(t) does not appear in the augmented incremental dynamics 233 since it is constant. The origin of the augmented incremental dynamics corresponds to the original servomotor dynamics 213 being at equilibrium with zero tracking error.

Still referring to FIG. 2, when the reference is constant r(t)=r(t−1)⇒Δr(t)=0 the augmented incremental dynamics 233 are linear, rather than the affine dynamics we see in the original servo-dynamics 213. Thus, asymptotic reference tracking for the original servomotor 120 of FIG. 1A, corresponds to asymptotically stabilizing the origin of the augmented incremental system 233. Using full-state feedback to stabilize the incremental dynamics produces a proportional-integral (PI) control policy 243 given by $$u(t) = F_P(t)x(t) + \sum_{k=0}^{t-1} F_I(k)e(k),$$

for the original servomotor, with controller gains $F_p: \mathbb{N} \to \mathbb{R}^{1 \times 2}$ and $F_I: \mathbb{N} \to \mathbb{R}$. The integral-action of the tracking controller automatically compensates for the constant disturbance W caused by the Coulomb friction forces.

Figure 3:
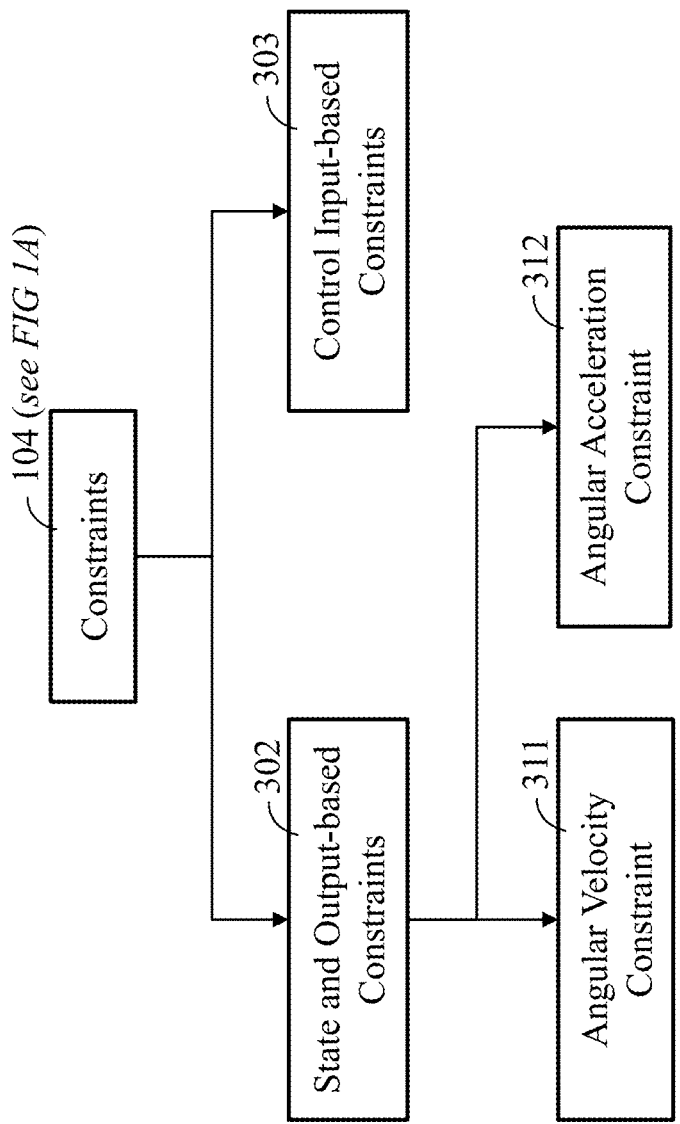
FIG. 3 is a block diagram illustrating constraints to be enforced during operation of the servomotor machine, according to some embodiments of the present disclosure.

FIG. 3 illustrates some constraints considered in some embodiments of the present disclosure. Specifically, an angular velocity constraint 311 given by $$0 \leq \theta(t)-\theta(t-1) \leq \tau\omega_{max}$$

and an angular acceleration constraint 312 given by $$\tau\alpha_{min} \leq \omega(t)-\omega(t-1) \leq \tau\alpha_{max}$$

are considered, according to some embodiments. Here, S ≻ 0 and Q ≻ 0 are weighting matrices on the tracking error and state rate-of-change, R ≻ 0 penalizes the actuator rate, $\omega_{max}$ denotes the maximum allowable angular speed 311, and $\alpha_{min} < 0 < \alpha_{max}$ are limiting constraints on angular acceleration 312. In other embodiments, the control input rate or control input could also be constrained 303, if the dc-gain of the servomotor is known or available from experimental data.

Figure 4:
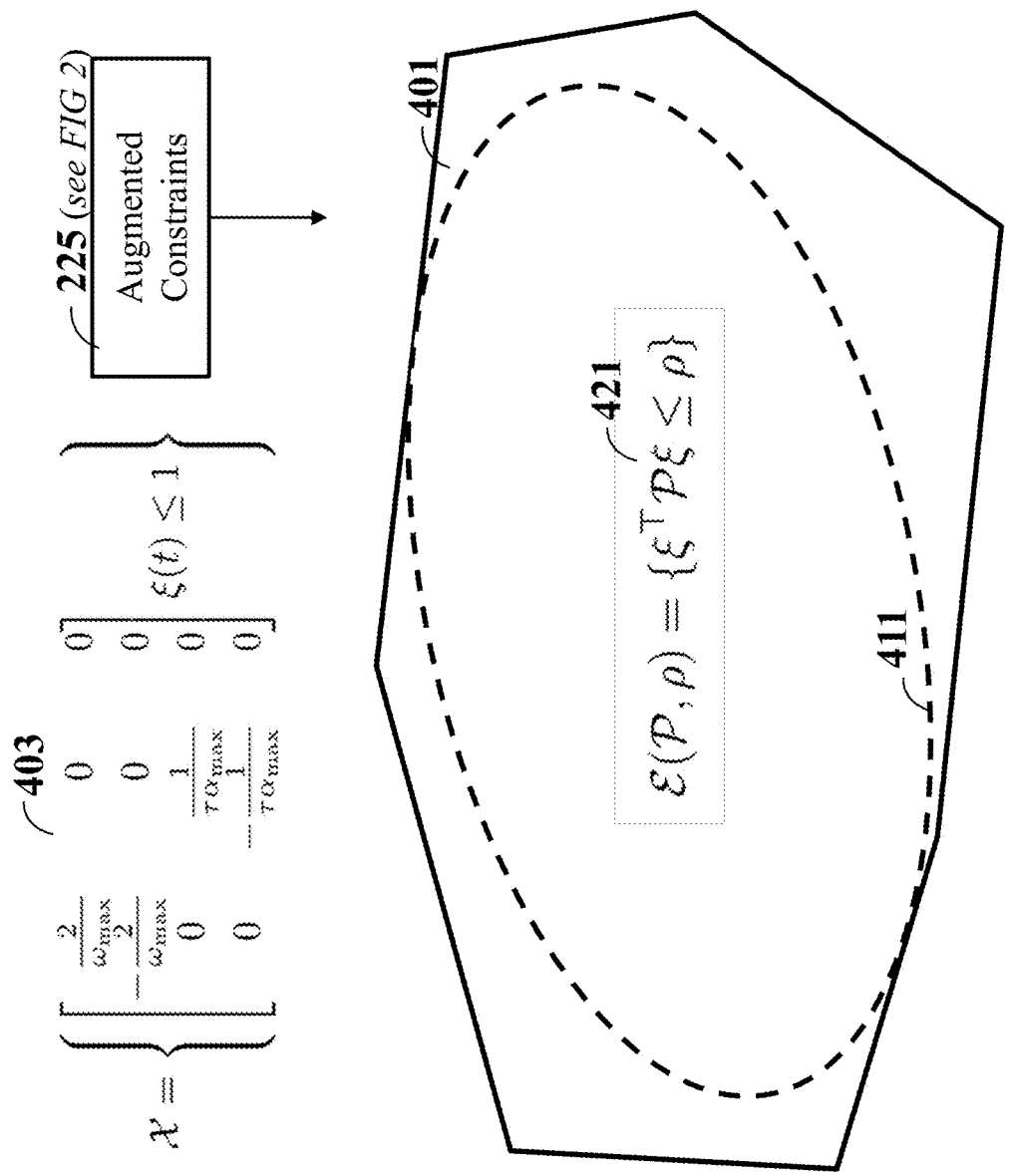
FIG. 4 is a schematic illustrating the constraints on the augmented system and a constraint-admissible invariant set (CAIS), according to some embodiments of the present disclosure.

FIG. 4 illustrates the augmented state constraints and the intuition behind constraint enforcement using CAISs. The state constraints for the servomotor can be written as augmented constraints 225 of FIG. 2, on the augmented incremental state ξ(t) of the augmented incremental system 233 of FIG. 2 as the polytopic constraint 403. Here, the augmented incremental position component of the state Δθ(t) =θ(t)−θ(t−1) has been offset by $\tau\omega_{max}/2$ so that the origin is in contained in the interior of the polytope 401. By the definition of stability, a stabilizing proportional-integral control policy 243 of FIG. 2, will keep the augmented incremental state in a neighborhood of the origin defined by a level-set of its Lyapunov function, called a constraint-admissible invariant set (CAIS) given by the ellipsoidal set 411 and parameterized by the inequality 421. Thus, the control policy 243 of FIG. 2, will enforce constraints 225 of FIG. 2 shown in FIG. 4, if the CAIS 411 is contained in the constraint polytope 401.

Figure 5:
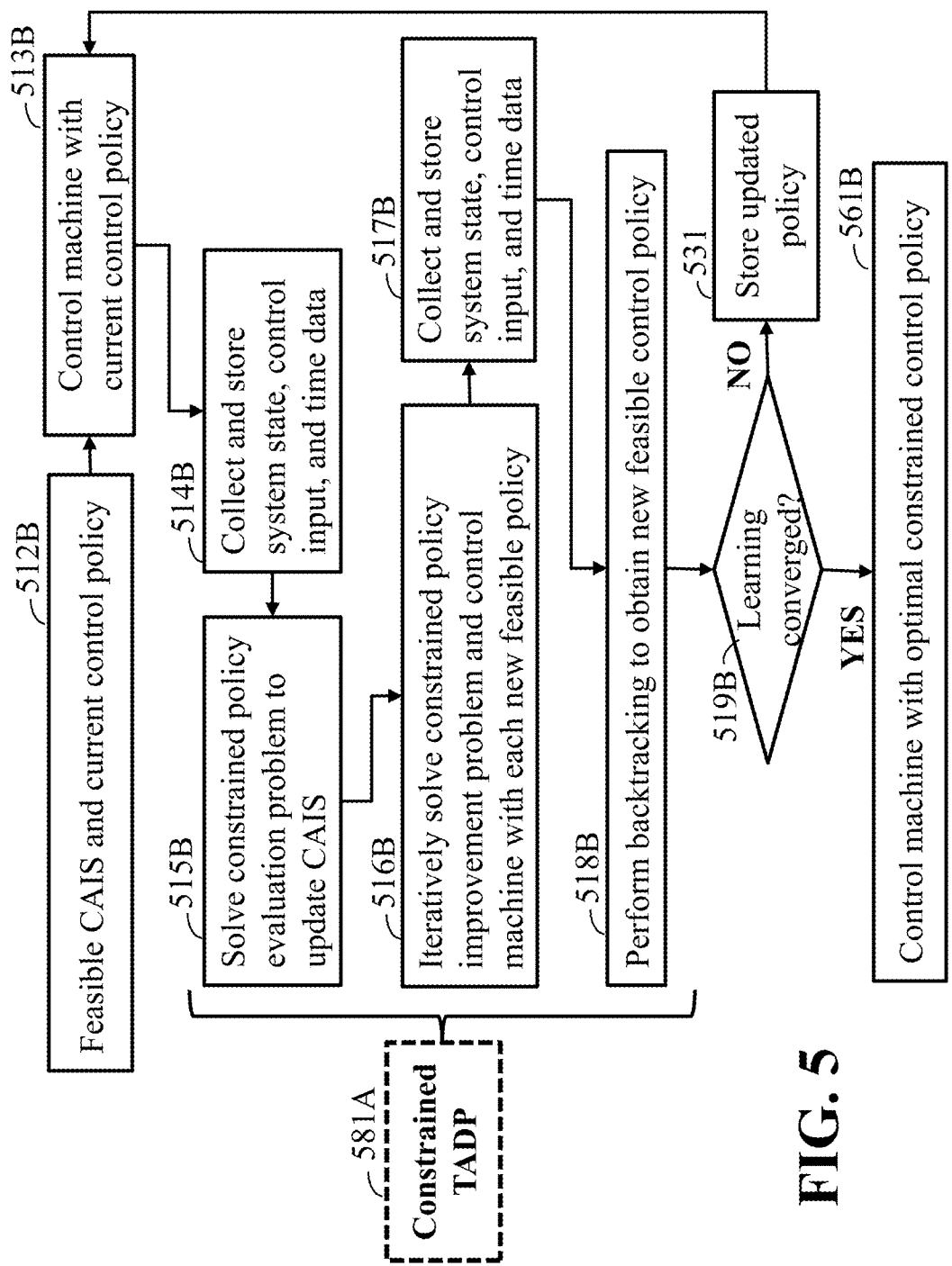
FIG. 5 is a block diagram illustrating a flowchart of some steps of a model-based version of the constrained TADP algorithm when the desired reference command signal is constant, according to some embodiments of the present disclosure.

FIG. 5 illustrates some steps in constrained TADP 581A with constant reference inputs. The algorithm is initialized with a feasible CAIS and a control policy for the initial reference input 512B. The servomotor machine is controlled with the initial control policy 513B and the relevant data is collected and stored for future computations. A constraint enforcing controller is synthesized using constrained TADP in two steps; policy evaluation 515B and policy improvement. In the policy evaluation step 516B, we compute the optimal invariant-set for the current controller that contains the current state ξ(t) and satisfies constraints. This is accomplished by solving the following semi-definite program $$\mathcal{P}_{t+1}, \rho_{t+1} = \operatorname*{argmin}_{P>0,\rho>0} \mathcal{J}_t \qquad (1a)$$

$$\text{subject to:} (\mathcal{A} + \mathcal{B}\mathcal{F}_t)^\top \mathcal{P}(\mathcal{A} + \mathcal{B}\mathcal{F}_t) - \lambda \mathcal{P} \preceq 0 \qquad (1b)$$

$$\xi(t)^\top \mathcal{P}\xi(t) \le \rho \qquad (1c)$$

$$\rho H H^\top \preceq \mathcal{P} \qquad (1d)$$

for some tuning parameter λ∈(0, 1). Here, $$\mathcal{J}_{(t)} = (\mathcal{A} + \mathcal{B}\mathcal{F}_t)^T \mathcal{P}(\mathcal{A} + \mathcal{B}\mathcal{F}_t) - \mathcal{P} + \mathcal{Q} + \mathcal{F}_t^T \mathcal{R}\mathcal{F}_t$$

with the augmented weighting matrices $\mathcal{Q}$ =blkdiag(Q,S) and $\mathcal{R}$ =R.

Minimizing the norm of $\mathcal{J}$ promotes a solution close to the optimal LQT control policy 243 of FIG. 2 for the incremental system, since $\mathcal{J}$ should be equal to zero if the discrete-time algebraic Riccati equation admits a control policy that is feasible, that is, that enforces state constraints. The LMI (1b) ensures that the invariant-set 421 of FIG. 4 parameterized by $\mathcal{P}_{t+1}$ and $\rho_{t+1}$ is invariant under the current controller gain $\mathcal{F}_t$, that is, the augmented incremental state will not leave the CAIS set 421 of FIG. 4 after it enters. The LMI (1c) ensures that the new invariant-set 421 of FIG. 4 contains the current state. Finally, the LMI (1d) ensures that the invariant-set satisfies the polytopic constraints 403 of FIG. 4.

Still referring to FIG. 5, data collected after updating the CAIS using constrained policy evaluation 516B is stored 517B for policy improvement 518B. In this step, we search for an optimal gain $\mathcal{F}_{t+1}$ among the controller gains that render the set $\varepsilon(\mathcal{P}_{t+1}, \rho_{t+1})$ 421 of FIG. 4 invariant. A first step is to evaluate $\mathcal{F}_{t+1} = -(\mathcal{R} + \mathcal{B}^T \mathcal{P}_{t+1} \mathcal{B})\mathcal{B}^T \mathcal{P}_{t+1} \mathcal{A}$ and then perform a backtracking operation 518B to find a feasible controller gain on the line $\mathcal{F}_t$ to $\mathcal{F}_{t+1}$, that satisfies input constraints. If the learning converges with respect to some predefined threshold 519B, then the optimal policy has been attained, otherwise the steps involved in 581A are repeated till the convergence criterion is attained. Wherein the updated policy can be updated 531 and the optimal constrained control policy 561B can be executed.

FIG. 6 is a schematic illustrating a flowchart of the model-based reference scaling method when the reference jumps or changes, that is Δr(t)≠0. The control gain $\mathcal{F}_{t+1}$ designed in constrained policy improvement 518B of FIG. 5, ensures constraint satisfaction as long as the reference is constant. However, large reference changes can cause constraint violation. To overcome this issue, rather than performing policy improvement, we use the previously estimated policy and scale 631 the implemented reference to obtain $$\hat{r}(t+1) = r(t) + \frac{1}{\mu_{t+1}} \frac{\Delta r}{|\Delta r|}$$

which involves computing the magnitude of the reference change 601, where the scaling factor $\mu_{t+1}$ is obtained by solving the semi-definite program 621; the scaled reference is then used as a command input without updating the tracking policy 611. As the scaled reference reaches the desired reference input 641, the reference scaling terminates 581A of FIG. 5.

FIG. 7 illustrates the transformation of the model-based version of the constrained TADP algorithm into a data-driven form when the desired reference command signal is constant, i.e. a method to transform the model-based constrained TADP and reference scaling method into a data-driven formulation, according to some embodiments of the present disclosure. Recall that the state x(t), control u(t), the reference r(t), and all their past values are available since they are stored data 102 of FIG. 1A. This implies that we can compute the augmented state ξ(t) with stored Δx(t) and e(t) values, the incremental control action Δu(t), and therefore the quadratic cost V(t) at every t in order to obtain $\mathcal{P}_{t+1}$ and $\mathcal{F}_{t+1}$. With the history $\{\xi_k\}_0^t$ and $\{\Delta u_k\}_0^t$, one can pose a semi-definite programming problem to obtain the updated CAIS and updated policy. The constrained policy evaluation step yields $\mathcal{P}_{t+1}$ and $\rho_{t+1}$ by solving the semi-definite programming problem 703. The norm and regularizer 711 is analogous to the norm of $\mathcal{J}$ a in the model-based version (1a) and can be evaluated because V(t) can be computed using stored data. Similarly the inequality 713 is analogous to (1b) with the model replaced with data. For a unique solution to be admitted, one cannot solve 703 with a single data point, and typically, a train of historical data is first collected and then the problem is solved with the LMIs 711,713,715 stacked for each instance of the collected data.

The constrained policy improvement step can also be performed by collecting data on-line and setting up a least squares problem, described herein. In the presence of a model, one could obtain the updated policy by using collected data and rank-one updates 704.

Still referring to FIG. 7A, for existence of solutions, the system needs to be persistently exciting. It is standard practice, therefore, to add a small-magnitude, random exploratory noise to the control input for data collection.

Figure 7B:
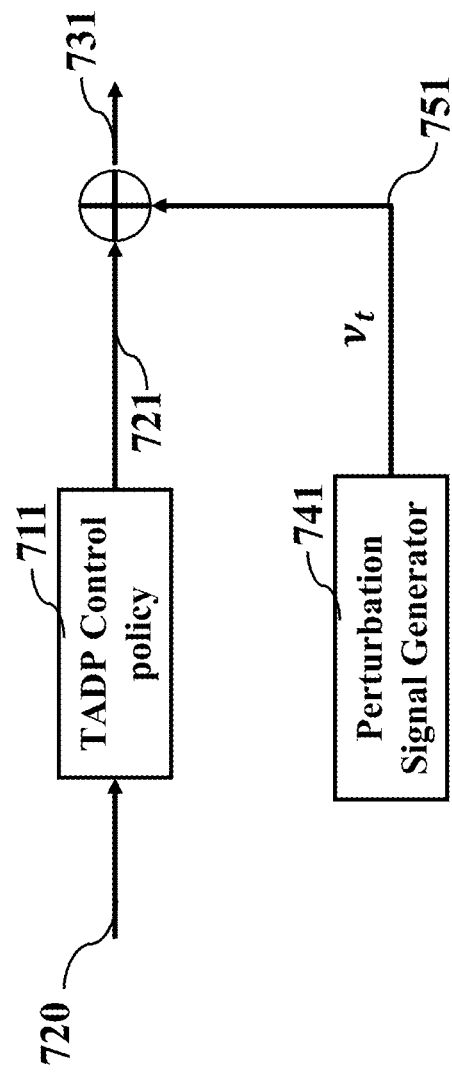
FIG. 7B is a block diagram illustrating aspects for adding exploration noise via a perturbation signal generator, according to one embodiment, according to some embodiments of the present disclosure.

FIG. 7B is a block diagram illustrating aspects for adding exploration noise via a perturbation signal generator, according to one embodiment, according to some embodiments of the present disclosure. This embodiment uses exploration noise to ensure persistence of excitation. For example, the embodiment, for the machine in the augmented state 721, generates a control action 721 via the current control policy 243 of FIG. 2. A small, randomly generated exploration noise $v_t$ 751 is produced by the perturbation signal generator 741, which is added to the control input 721 to construct the actual control signal 731.

Herein, the small exploratory noise is generated by a signal generator 741 that produces random noise whose distribution has finite support, where the magnitude of this random noise does not exceed the control input value. The advantage of the perturbation noise is to ensure that the modes of the machine are persistently excited to improve the learning.

FIG. 8A is a block diagram illustrating a flowchart of the data-driven constrained TADP algorithm when the desired reference command signal changes, according to some embodiments of the present disclosure.

FIG. 8B is illustrating some equations for the data-driven constrained TADP algorithm of FIG. 8A, when the desired reference command signal changes, according to some embodiments of the present disclosure.

Referring to FIG. 8A and FIG. 8B, which provide a way to perform reference scaling using data, one can then design the scaling factor, by solving the semi-definite programming problem 802 of FIG. 8B. The component $\mathcal{A}\xi(t)$ is unknown, since $\mathcal{A}$ is unknown, but the other terms are known, or can easily be calculated for a given reference scaling. If one uses a history of the augmented states wherein the state $\xi(t)$ has been passed before by the servomotor, such as in repetitive tasks, then one can use this prior history 821 of FIG. 8A to compute the reference scaling 811 of FIG. 8A. More rigorously, in some embodiments, the condition: for each $t\in \mathcal{T}':=\{t:\Delta r\neq 0\}$, there exists some time instant $t_e(t)\in[t_0, t]$ such that $\xi(t_e(t))=\xi(t)$, holds true. If this condition is satisfied, we can obtain the estimate by $$\mathcal{A}\xi(t)=\mathcal{A}\xi(t_e(t))=\xi(t_e(t)+1)-\mathcal{B}\Delta u(t_e(t))-\mathcal{G}\Delta r(t_e(t)).$$

Substituting this into the reference scaling equation 803, we get, $$\xi_\mu=\xi(t_e(t)+1)--\mathcal{B}\Delta u(t_e(t))-\mathcal{G}\Delta r(t_e(t))+\mathcal{B}\Delta u(t)+\mathcal{G}\Delta r(t).$$

With this form of $\xi_\mu$, we can perform the reference scaling in a data-driven manner 811 by employing a line search to maximize $\mu^{-1}\in[0, |\Delta r(t)|]$ that satisfies 804 of FIG. 8B.

FIG. 9A is a schematic illustrating a drilling task and stroke lengths required as a reference input for a servomotor 901 having a drill bit 905 and a workpiece 903, according to some embodiments of the present disclosure. Being capable of fulfilling single-axis positioning tasks, servomotor finds a wide range of industrial applications, such as milling machines, chip mounting machines, web machines, and laser drilling machines. The TADP uses drilling machines as a teaching example, and can be applied to other machines where their prime movers desired movement comprises of a series of piecewise constant position commands, as 902. The servomotor 901 is particularly relevant with this work. In the drilling process, a drilling head is first moved atop of the location of the hole 907, stands still, and then the laser beam will be fired to melt material 903 and drill a hole 907. Because the drilling head has to stop at the hole, the movement of the drilling head for drilling a series of holes can be decomposed into a number of point to point single-axis positioning tasks.

This behavior is illustrated in FIG. 9A, wherein the piece on which the holes are to be drilled, the servomotor and drill bit, the direction of motion of the drill to attain the correct sequence of cuts, and the corresponding reference to be tracked to make the four holes (without returning to the origin), are all shown in the figure. Although in practice, there are two servomotors, each of which are capable of single-axis motion, since the two motors are temporally decoupled, we focus our results on one of the servomotors for simplicity. Consequently, we have one reference signal r to track. The stroke lengths required by each servomotor along the edges of the piece to attain the correct positioning for drilling are shown in radians: these stroke lengths correspond exactly to the magnitude of the reference signal. The servomotor parameters and constraint values are provided in Table I.

FIG. 9B is a Table (Table I) illustrating true servometer parameters and constraints, according to some embodiments of the present disclosure. While most parameter values have been taken, we consider two sets of velocity and acceleration constraints to illustrate the effectiveness of this approach. The first set, labeled 'feas', denotes a scenario when the optimal LQR tracking control policy is feasible, and when the constrained ADP is expected to converge to the optimal policy: these are the constraint values considered. The second set of constraints, labeled 'infeas', considers a more challenging problem than that investigated before: namely, when the constraints are too tight to admit the optimal LQR policy: therefore, the constrained ADP is expected to converge to the best feasible controller rather than the optimal LQR policy.

Still referring to FIG. 9A and FIG. 9B, hyperparameters required for the constrained ADP algorithm are as follows. The cost function weight matrices are given by S=1, Q=0, and R=10. The sampling time $\tau$=10 ms, the initial state is the origin, and $\lambda$=0.999. The initial feasible policy and initial CAIS ellipsoid is parametrized by $$\mathcal{K}_0 = [\,-0.3501 \quad -0.0325 \quad -0.0150\,]$$

and $$\mathcal{P}_0 = 10^3 \begin{bmatrix} 5.4859 & 0.0523 & 0.2568 \\ 0.0523 & 0.0055 & 0.0023 \\ 0.2568 & 0.0023 & 0.0233 \end{bmatrix}$$

which is obtained by model-free tuning of a proportional-integral control policy and estimating an ellipsoidal admissible domain of attraction from data that lies within the constraint set $\chi$.

We begin with the case when the optimal LQR tracking controller $\mathcal{F}_\infty$ is feasible: that is, one can track the desired r(t) signal without violating constraints using the control policy $\Delta u(t)=\mathcal{F}_\infty\xi(t)$.

Figure 10A:
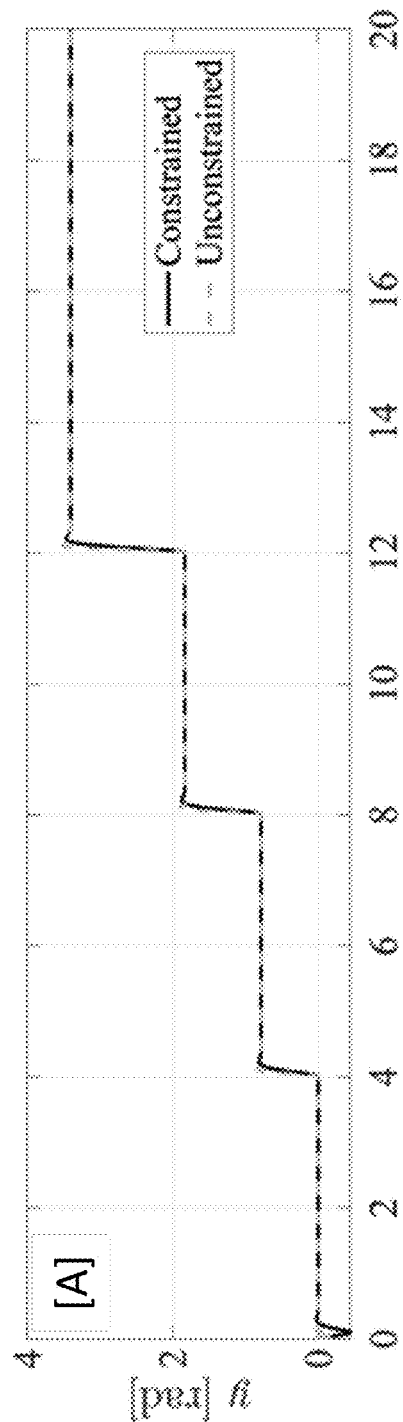
FIG. 10A is a schematic illustrating a point-to-point positioning task required during laser drilling operation using servomotor controlled laser drills, i.e. position in radians for the unconstrained and constrained ADP for a problem where the optimal tracking controller is "infeasible", according to some embodiments of the present disclosure.

FIG. 10A describes a point-to-point positioning task required during laser drilling operation using servomotor-controlled laser drills, i.e. position in radians for the unconstrained and constrained ADP for a problem where the optimal tracking controller is "infeasible", according to some embodiments of the present disclosure.

Figure 10B:
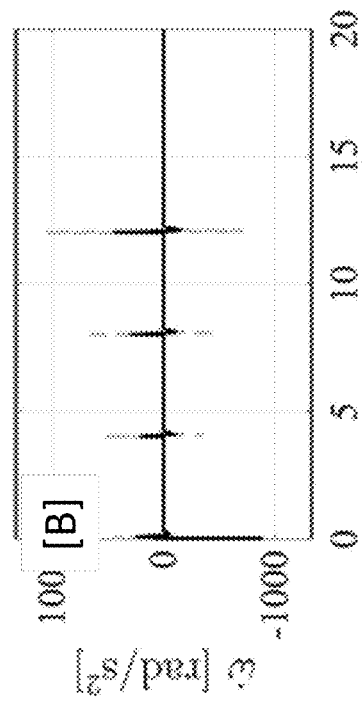
FIG. 10B and FIG. 10C illustrate a scenario where the constrained TADP is executed on the drilling task, and the constraints are such that the optimal TADP controller is "constraint-feasible", in particular, illustrated is the angular velocity and acceleration with hard constraints for the servomotor driven by unconstrained (dashed line) of FIG. 10B, and constrained ADP (black continuous line) of FIG. 10C, according to some embodiments of the present disclosure.
Figure 10C:
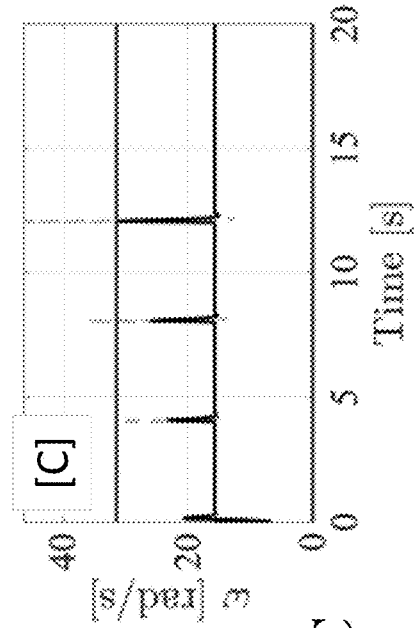

FIG. 10B and FIG. 10C illustrate a scenario where the constrained TADP is executed on the drilling task, and the constraints are such that the optimal TADP controller is "constraint-feasible", in particular, illustrated is the angular velocity and acceleration with hard constraints for the servomotor driven by unconstrained (dashed line) of FIG. 10B, and constrained ADP (black continuous line) of FIG. 10C, according to some embodiments of the present disclosure.

FIG. 10D illustrates an evolution of normed error in a $\mathcal{P}$ matrix, according to some embodiments of the present disclosure.

FIG. 10E illustrates Evolution of normed error in the $\mathcal{F}$ matrix, according to some embodiments of the present disclosure.

Referring to FIG. 10A to FIG. 10E, FIG. 10A illustrates the performance of constrained ADP tracking in such a scenario. From subplot [A] or FIG. 10A, we observe that the output trajectories are identical for the optimal policy and the constrained ADP policy, which disparity seen only in the first few seconds when the ADP iterations are still reaching the fixed point; see [D] or FIG. 10D and [E] or FIG. 10E for convergence of the iterates $\mathcal{P}_t$ and $\mathcal{F}_t$ to their respective optima. The fact that the optimal policy can be achieved without violating the velocity and acceleration constraints is evident from subplots [B] or FIG. 10B and [C] or FIG. 10C.

FIG. 11A describes a point-to-point positioning task required during laser drilling operation using servomotor controlled laser drills, i.e. position in radians for the unconstrained and constrained ADP for a problem where the optimal tracking controller is "feasible", according to some embodiments of the present disclosure.

FIG. 11B and FIG. 11C illustrate a scenario where the constrained TADP is executed on the drilling task, and the constraints are such that the optimal TADP controller is "constraint-feasible", in particular, illustrated is the angular velocity and acceleration with hard constraints for the servomotor driven by unconstrained (dashed line) of FIG. 11B, and constrained ADP (black continuous line) of FIG. 11C, according to some embodiments of the present disclosure.

Figure 11D:
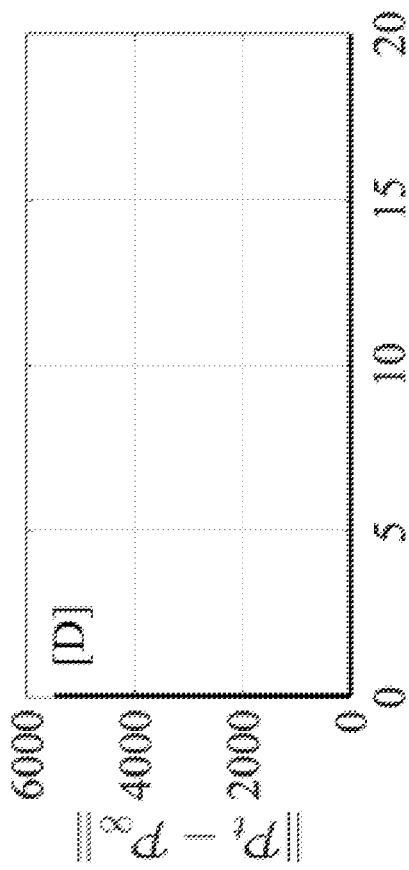
FIG. 11D illustrates an evolution of normed error in a $\mathcal{P}$ matrix, according to some embodiments of the present disclosure.

FIG. 11D illustrates an evolution of normed error in a $\mathcal{P}$ matrix, according to some embodiments of the present disclosure.

Figure 11E:
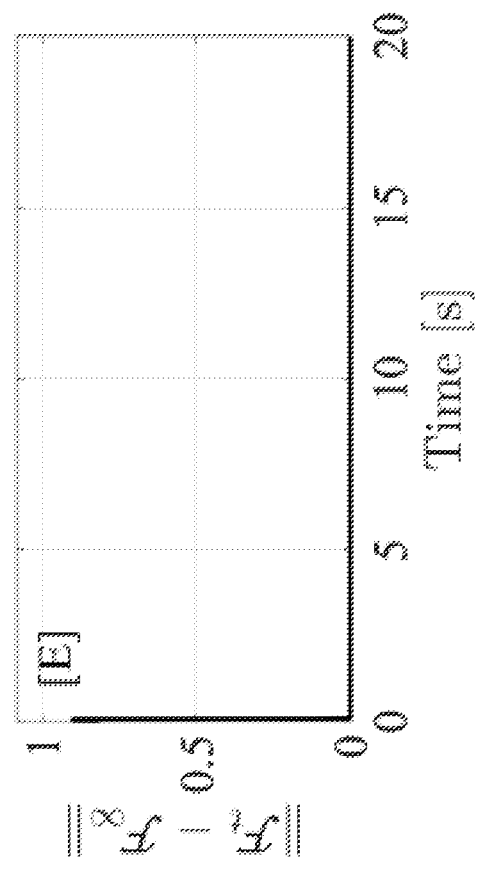
FIG. 11E illustrates Evolution of normed error in the $\mathcal{F}$ matrix, according to some embodiments of the present disclosure.

FIG. 11E illustrates Evolution of normed error in the $\mathcal{F}$ matrix, according to some embodiments of the present disclosure.

Referring to FIG. 11A to 11E, a more interesting scenario is investigated next, wherein the optimal (unconstrained) policy $\mathcal{F}_\infty$ will result in constraint violation for the given reference signal. We ensured infeasibility of $\mathcal{F}_\infty$ by tightening to more restrictive constraints than considered in the prior experiment. The fact that employing $\mathcal{F}_\infty$ results in velocity constraints being violate is apparent from subplot [C] or FIG. 11C: constraint violation occurs twice, during the drilling of the final two holes. Conversely, the constrained ADP formation results in no constraint violation, despite the same reference being tracked: the effectiveness of the reference adaptation is especially noteworthy around 12 seconds, when the velocity grazes and recovers from the constraint. As expected, the output trajectories in subplot [A] or FIG. 11A are different at the reference jumps: the constrained ADP has a smoother, less aggressive halting motion compared with the optimal tracking controller. From the subplots [D] or FIG. 11D, and [E] or FIG. 11E, we notice another interesting phenomenon: that the sequence of $\mathcal{P}_t$ and $\mathcal{F}_t$ converges not to $\mathcal{P}_\infty$ and $\mathcal{F}_\infty$ but to the pair of value function and policy matrices that are feasibly optimal. In other words, the system learns the best tracking policy that is constraint-enforcing automatically and does not attain "an optimal tracking policy" that would be infeasible: in such cases, it will attain the closest policy to the optimal tracking policy that is constraint feasible.

Accordingly, aspects of the present disclosure can be for computing optimal tracking policies for servomotors with velocity and acceleration constraints. Some aspects learned is that the optimal and feasible policies using a novel combination of constrained ADP and reference adaptation for scenarios where the reference signal is known and piece-wise constant, can be utilized for many servomotor applications such as laser drilling. The problem of the present disclosure is posed as a semidefinite program that can be solved online using standard convex programming methods, both in a model-based and data-driven manner.

Figure 12A:
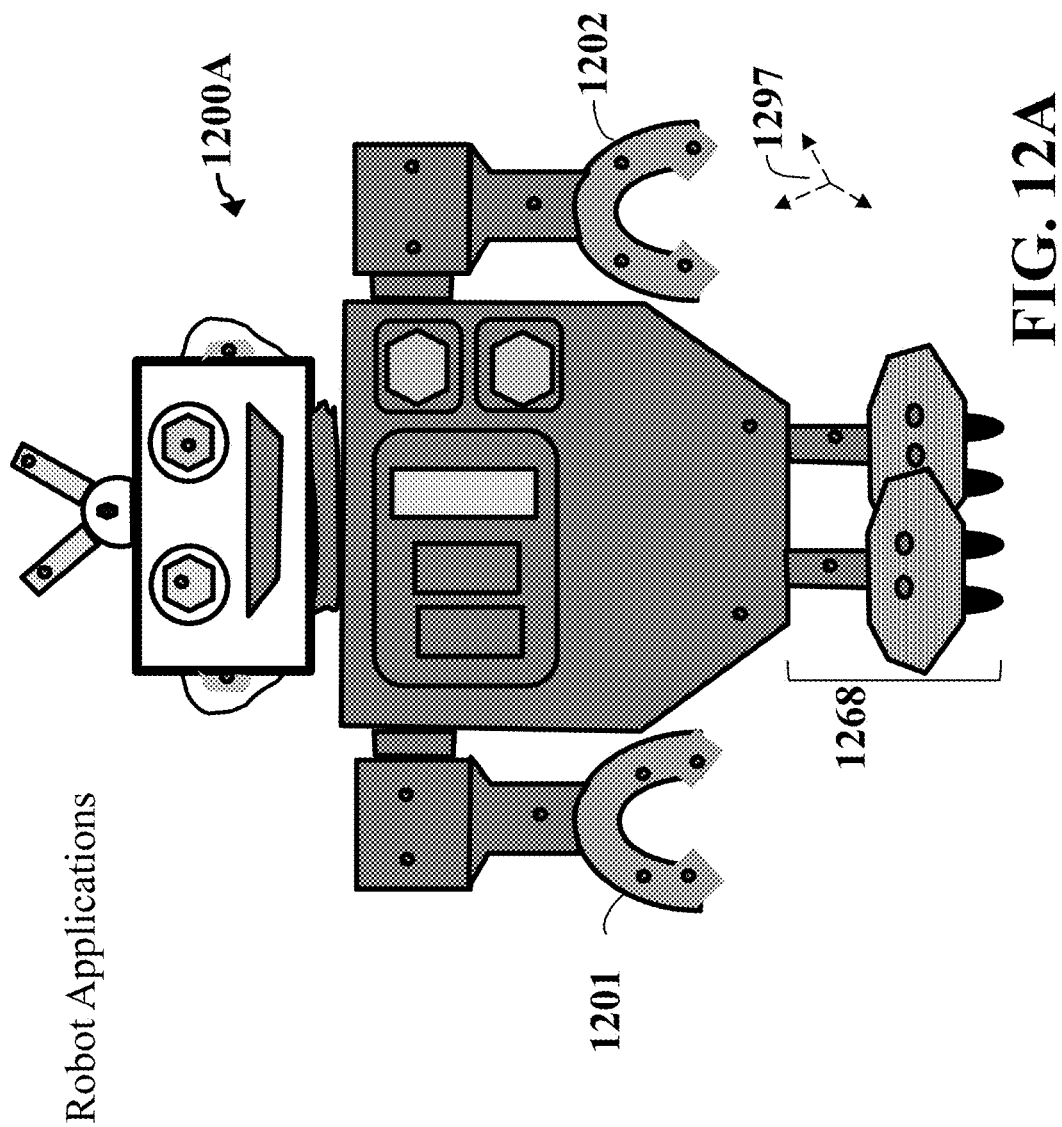
FIG. 12A is a schematic illustrating an overview of the robot system, according to some embodiments of the present disclosure.

FIG. 12A is a schematic illustrating an overview of the robot system, according to an embodiment of the present disclosure. The robot system can include a gripper endpoint assembly 1201, 1202 designed to mount on an end of a common industrial or research robot 1200A. A set of flexible reverse internal twinned cables (not shown), connects the gripper endpoint assembly 1201, 1202 to a motor mount (not shown), containing as many servo motors (not shown) as needed to actuate each remote degree of freedom in the gripper endpoint assembly 1201, 1202. Servomotors (not shown) can be located distally from the gripper endpoint assembly 1201, 1202 within the research robot 1200A, or outside of the research robot 1200A, and may be cooled by fans or other like devices (not shown).

Still referring to FIG. 12A, note that at least one implementation of the present disclosure can have many degrees of freedom for the gripper endpoint assembly 1201, 1202 actuated via reverse twinned cables (not shown). Although, this is not completely necessary; in some specific applications a gripper-mounted actuator (such as a fine tweezer, a drill, a grinder, etc.) might be mounted on the endpoint gripper assembly and any degree of freedom associated with that particular action could be powered by an actuator mounted on the gripper endpoint assembly 1201, 1202.

Some embodiments of the present disclosure can have the servo motors (not shown) design that accepts positioning commands (either as software commands, or as step-and-direction motion akin to a stepper motor) and returns status to a controller (see FIG. 12B), such as actual position, commanded versus actual position error, motor drive current, and shaft torque.

Figure 12B:
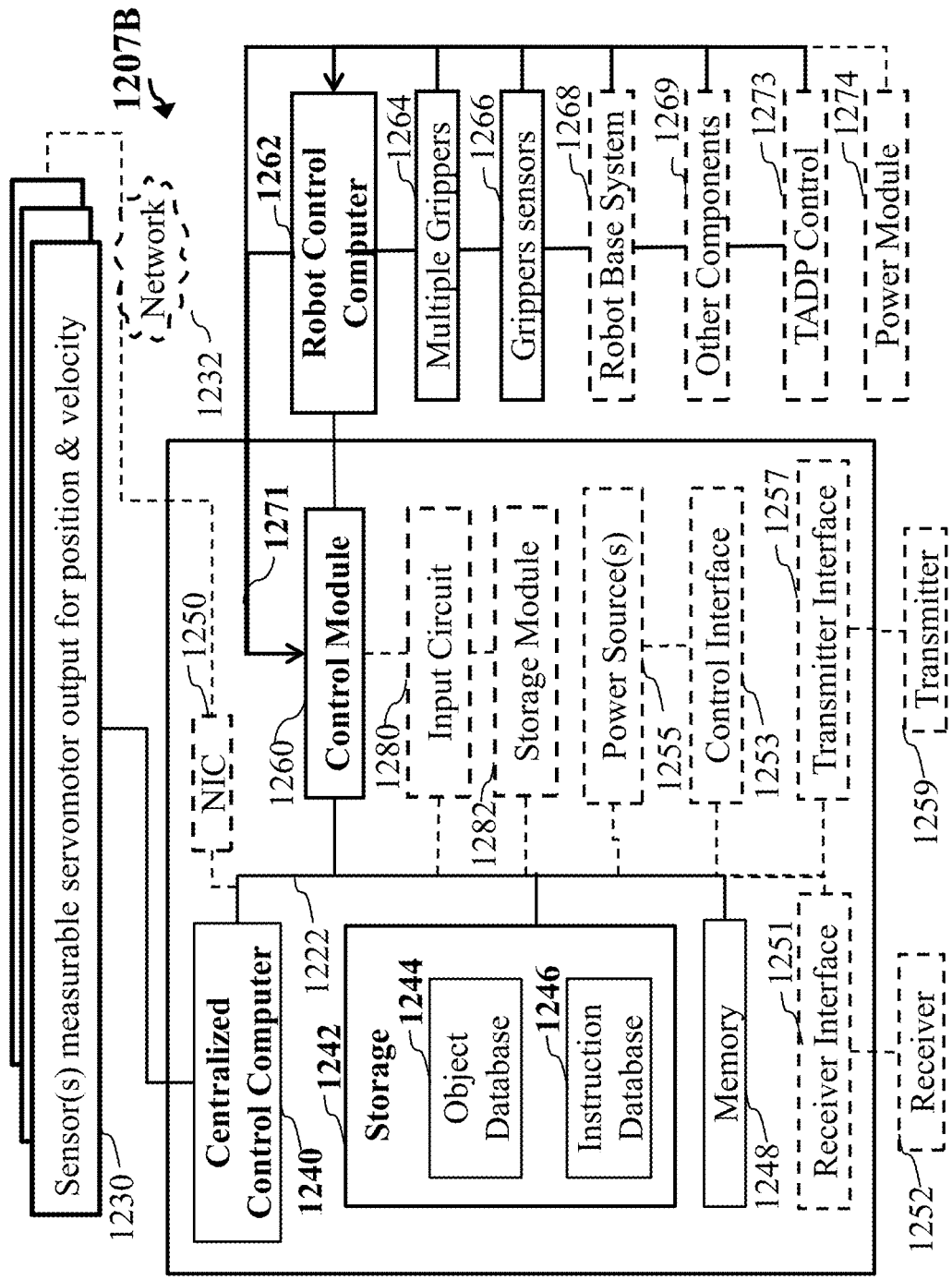
FIG. 12B is a schematic diagram illustrating some components for a centralized controller system of the robot system of FIG. 12A, according to some embodiments of the present disclosure.

FIG. 12B is a schematic diagram illustrating some components for a centralized controller system 1207B of the robot gripper system 1201, 1202 of FIG. 12A, according to some embodiments of the present disclosure. For example, a centralized control computer 1240 can be located within the research robot 1200A of FIG. 12A. The centralized control computer 1240 can be connected to sensors 1230 located within an environment (not shown) and positioned within a sensing distance of at least one object (not shown) to be moved by the centralized control computer 1240. The sensors 1230 can be cameras, video cameras, speed sensors, light sensors, environmental related sensors (i.e. temperature, humidity, fire, air, water, barometer sensors, etc.), used with the robot gripper system 1201, 1202 of FIG. 12A. The sensors 1130 can be hardwired and/or wireless, such that a network 1232 can be within an operating distance range of the sensors 1230.

The centralized control computer 1240 is connected to a bus system 1222 that connects to storage 1242. The storage 1242 can include an object database 1244, an instruction database 1246, an object historical database (not shown), an instruction historical database (not shown), an environmental database (not shown), a human worker database (not shown) where worker data is associated with the operation of the research robot 1200A of FIG. 12A, other databases (not shown) can have data related to operation and information usable by the robot gripper system 1201, 1202 of FIG. 12A. Again, depending upon each user/operator's specific operational configurations/structure/special needs/ sensitivities of the intended use of the robot gripper system 1201, 1202 of FIG. 12A, many different configurations are contemplated.

Still referring to FIG. 12B, a memory 1248 is connected to the bus system 1222, along with a receiver interface(s) 1251, a receiver(s) 1252 and a power source(s) 1255. The power source(s) 1255 can be connected to the bus system 1222, connected to a control interface 1253, or be configure to have a multitude of other configurations, all of which, is contemplated depending on the specific user/operator intended specific needs for operations. It is possible the power source(s) can be electric, renewable energy sources, chemical, as well as directly connected to the robot gripper system 1201, 1202 of FIG. 12A, have a multiple external power sources of different types, or both. A transmitter interface(s) 1257 and transmitter(s) 1259 are connected to the bus system 1222. Also, a network interface controller 1250 (NIC, also known as a network interface card, network adapter, LAN adapter or physical network interface, and by similar terms, is a computer hardware component connecting a computer to a computer network) is connected to the bus system 1222 and can be in communication with a network 1232 or other different types of wireless networks (not shown). Again, depending upon the special needs for operation & sensitives needed by a user/operator for their intended use.

A control module(s) 1260 can be connected to the bus system 1222. The control module(s) 1260 can be connected to a robot control computer(s) 1262, that assist in directing components of the robot control computer 1262. Some components can include, by non-limiting example, multiple grippers 1264, grippers sensors 1266, robot base system 1268 of FIG. 12A, and other robot related components 1269, which all can be connected to the robot control computer(s) 1262, and/or the control module 1260, via 1271. The control Module 1260 can be configured from robot control computer 1262 to check a multi-grippers force status once, and report back, thereby confirming or refuting a grip of an object (not shown), or to continuously monitor the multi-grippers operational status at frame rates and interrupt the robot control when the multi-grippers indicates either a good or an invalid grip. Contemplated is that the robot control computer can have a power module 1274, that can include any power source that provides power to the robotic system such as a power adaptor or a rechargeable battery pack depending on the user specific requirements.

Still referring to FIG. 12B, the centralized control computer 1240 can implement or execute stored instructions that are stored in memory 1248, storage 1242 or access from a cloud storage via the network 1232, in particular, the centralized control computer 1240 can access the prestored data including data from the object database 1244, the instruction database 1246, or other stored data from other databases (not shown), as noted above.

Still referring to FIG. 12B, the robot control computer 1262 can command each gripper of the multiple grippers 1201, 1202 of FIG. 12A to move long an X axis, Y axis or Z axis 1297, to open, close the multiple grippers 1201, 1202 of FIG. 12A or some other action command. Contemplated is that the centralized controller system 1207B can include TADP control 1273 connected to the grippers 1201, 1202 of FIG. 12A, grippers sensors 1266, robot base system 1268, and other components 1269. Also contemplated is that some component sensors (i.e. sensors associated with the drill head, laser, servomotor(s), drill bit(s) or any other components of the laser drilling machine or associated with the laser drilling machine), and other components (not shown) can be utilized. Contemplated is that multiple types of sensors can be located on or in an approximate area of the laser drilling machine. Multiple types of sensors can be located on the research robot 1200A of FIG. 12A, as represented by small black circles.

The TADP is a constrained tracking approximate dynamic programming (TADP) that can determine constrained control policies based on data obtained during the operation of the controlled machine. Wherein, the TADP control 1273 can include a sensor hardware processor (not shown) connected to a sensor memory (not shown) that includes stored software (not shown) and pre-learned XY sets database that includes labels and surface force values. The sensor hardware processor (not shown) can implement or execute stored instructions that are stored in the sensor memory (not shown), and when any sensor data is received, the received data can be compared to stored data and sensor stored data, and send sensor data/signals, such as warning messages associated with any of the components or associated components of the laser drilling machine, etc., to the laser drilling control computer 1262 or other components of the system 11207B. Another aspect of the systems and components of the present embodiments, is that software or hardware, or some combination thereof, can be implemented via localized storage or through a cloud-based system.

The sensor control computer 1273 can include a hardware processor (not shown) connected a memory (not shown) that includes stored software (not shown) and pre-learned XY sets database that includes labels and surface force values. The hardware processor (not shown) can implement or execute stored instructions that are stored in memory (not shown), and when any sensor data is received, the received data can be compared to stored data, and send sensor data/signals, such warning messages, a level of grasp/grip by one or all grippers, etc., to the robot control computer 1262 or other components of the system 1200B. Although, one set of grippers are shown with supporting operating components, multiple sets of grippers are contemplated to either operate individually or work jointly with other sets of grippers, depending upon the user specific requirements. Another aspect of the systems and components of the present embodiments, is that software or hardware, or some combination thereof, can be implemented via localized storage or through a cloud-based system.

Further, the control or controller module 1260 can include different applications and programs for implementing methods of the present disclosure. For example, the control module 1260 can include applications for processing information received from the robot control computer 1262, such as generating graphs, operation related models including 3D models of the environment where the robot system is located as well as an object specific type of model. The control module 1260 can include applications for interpreting control inputs, or input signals, received via the input circuit/interface module 1280, storage module 1282, and generating commands/actions at the robotic control computer 1262. For example, some aspects of the robot system can include types of control methods relating to stable and scaled motion, combination related control of the grippers with the palm base structure or other structures, collision detection and avoidance, compliance control and constrained motion, etc.

Figure 13A:
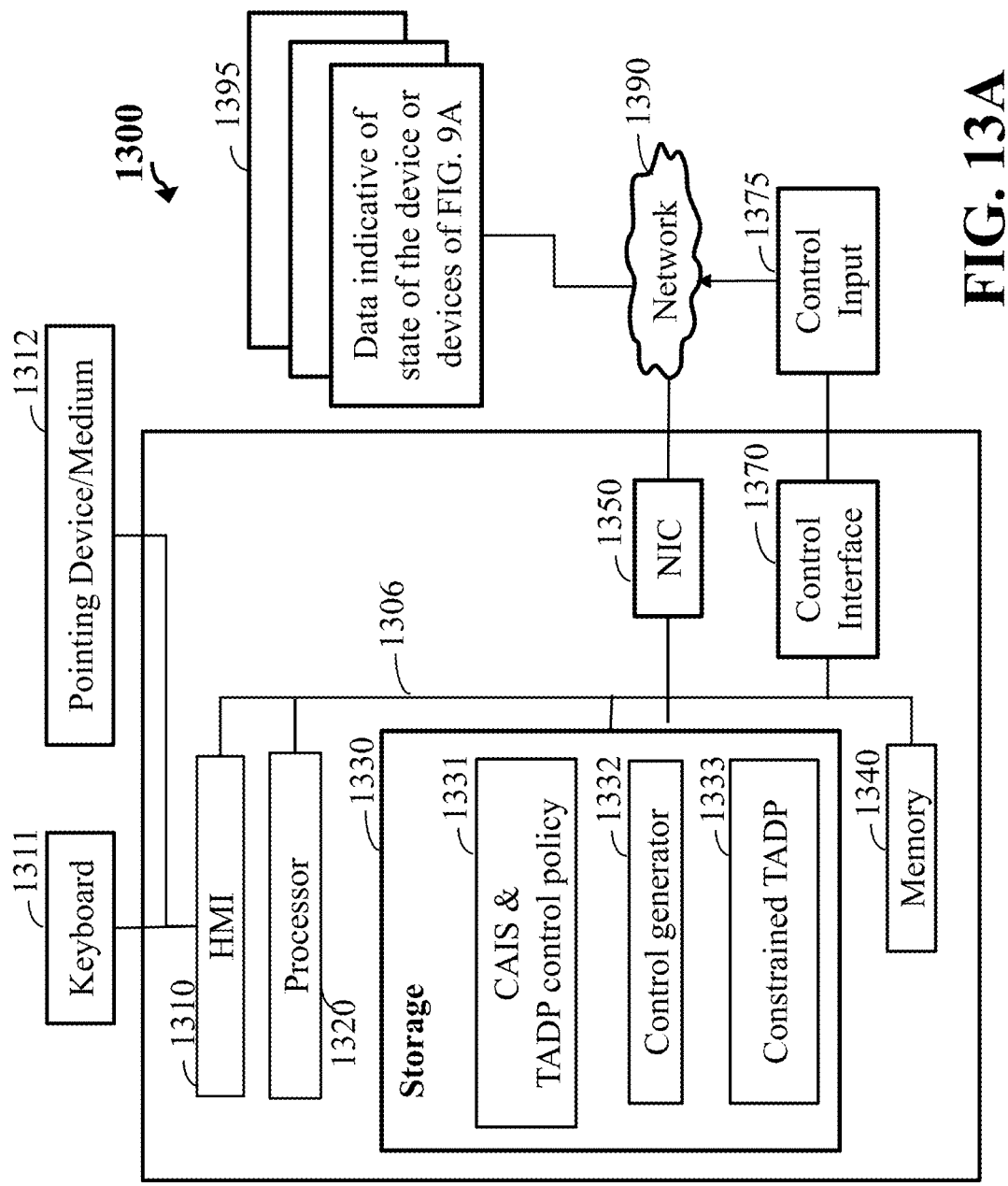
FIG. 13A is a schematic illustrating some components of an alternate centralized controller system that can be used for implementing some apparatus, systems and methods, according to some embodiments of the present disclosure.

FIG. 13A is a schematic illustrating some components of an alternate centralized controller system that can be used for implementing some apparatus, systems and methods, according to some embodiments of the present disclosure. The centralized controller system 1300A can have a number of interfaces connecting a device or devices of FIG. 9A with other machines and devices. A network interface controller 1350 is adapted to connect the centralized controller system 1300A through the bus 1306 to a network 1390 connecting the centralized controller system 1300A with the device or devices of FIG. 9A. To that end, the controller includes an output interface, e.g., a control interface 1370, configured to submit the sequence of control inputs 1375 to the device or devices of FIG. 9A through the network 1390 and includes an input interface, e.g., a network interface controller (NIC) 1350 configured to accept through the network 1390 the data 1395 indicative of the state of the device or devices of FIG. 9A. The centralized controller system 1300 can also include other types of input and output interfaces. For example, the centralized controller system 1300A can include a human machine interface 1310. The human machine interface 1310 can connect the controller to a keyboard 1311 and pointing device 1312, wherein the pointing device 1312 can include a mouse, trackball, touchpad, joy stick, pointing stick, stylus, or touchscreen, among others.

The centralized controller system 1300A includes a processor 1320 configured to execute stored instructions, as well as a memory 1340 that stores instructions that are executable by the processor. The processor 1320 can be a single core processor, a multi-core processor, a computing cluster, or any number of other configurations. The memory 1340 can include random access memory (RAM), read only memory (ROM), flash memory, or any other suitable memory machines. The processor 1320 can be connected through the bus 1306 to one or more input and output devices.

The processor 1320 is operatively connected to a memory storage 1330 storing the instruction as well as processing data used by the instructions. The storage 1330 can form a part of or be operatively connected to the memory 1340. For example, the memory storage can store the state constraints and the input constraints for the device or devices of FIG. 9A. Additionally or alternatively, the memory storage is configured to store a CAIS of states of the device or devices of FIG. 9A satisfying the state constraints and a corresponding control policy mapping a state of the device or devices of FIG. 9A within the CAIS to a control input satisfying the control input constraints 1931. As used herein, a control of the device or devices of FIG. 9A having the state within the CAIS according to the corresponding control policy maintains the state of the device or devices of FIG. 9A within the CAIS.

The processor 1320 is configured to jointly control the machine and update the CAIS and the control policy. To that end, for performing the joint control and update, the processor is configured to execute a control generator 1332 to the device or devices of FIG. 9A using the control policy 1331 to collect data including a sequence of control inputs 1375 generated using the control policy 1331 and a sequence of states 1395 of the device or devices of FIG. 9A within the CAIS corresponding to the sequence of control inputs; and execute a constrained policy iteration solver 1333 to update the CAIS and the control policy subject to the state constraints and the input constraints.

Figure 13B:
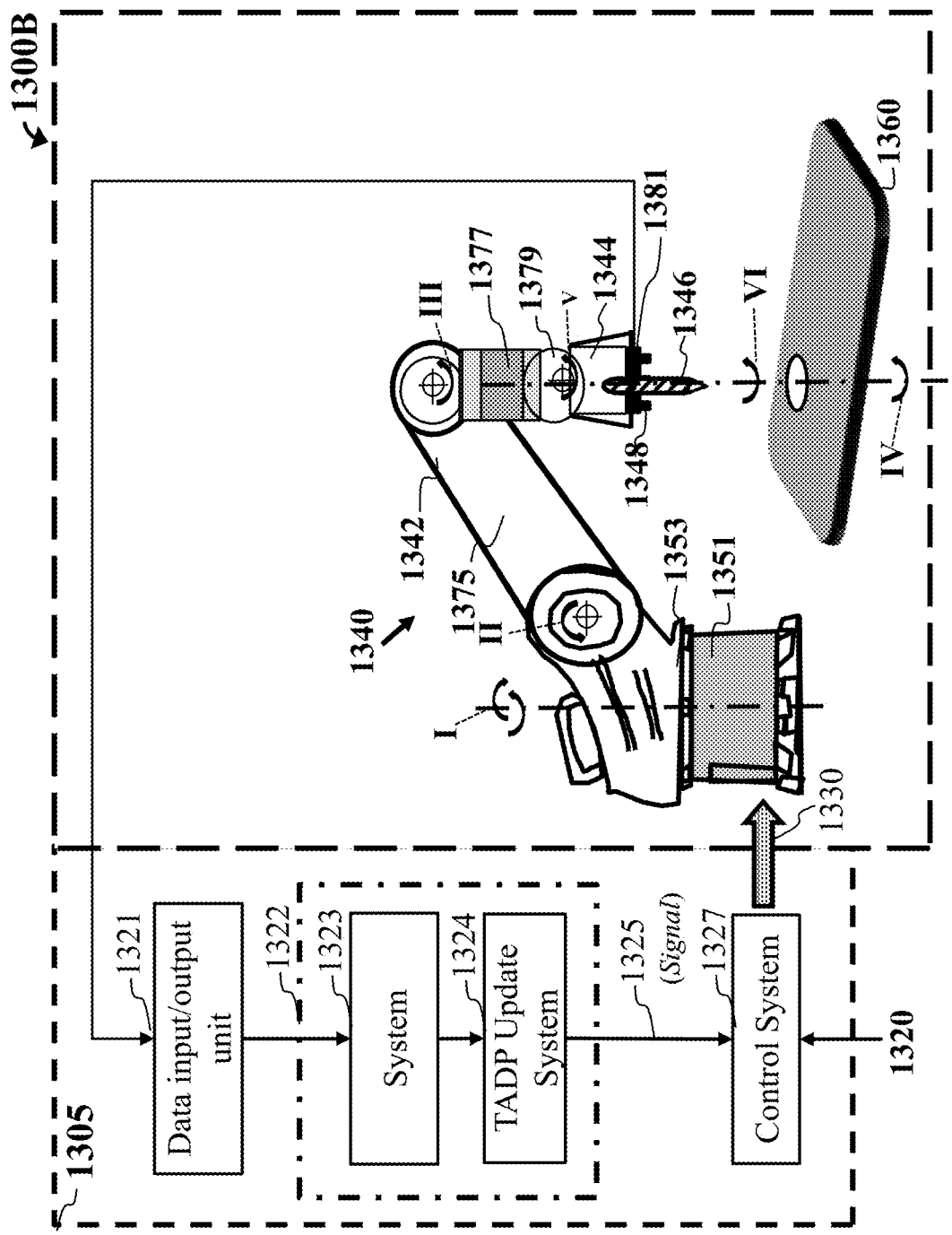
FIG. 13B schematic illustrating a laser machine system 1300B that the systems and methods of the present disclosure can be incorporated, according to some embodiments of the present disclosure.

FIG. 13B a schematic illustrating a laser machine system 1300B that the systems and methods of the present disclosure can be incorporated, according to some embodiments of the present disclosure. For example, the laser machine system 1300B can include a laser machining device 1340 having a multiaxial mechanical manipulator 1342 and a laser tool 1344 with a drill bit 1346, which emits at least one laser beam 1348 towards a workpiece 1360.

The manipulator 1342 can have at least six-axis articulated arm robot. A base 1351 on which a bracket 1353 is mounted rotatably about a first, vertical axis of rotation I, a rocker 1375 being in turn mounted pivotably about a horizontal pivot axis II on the bracket 1373. A robot arm 1377 is mounted pivotably about another horizontal pivot axis III at the upper end of the rocker 1375, and a three-axis robot hand 1379 with three intersecting hand axes IV, V and VI being arranged at the front end of the robot arm 1375. At the front end, the robot hand 1379 has a rotatable driven flange 1381, on which the laser tool 1344 is mounted.

A laser light source (not shown) may be arranged externally, the laser beam 1348 can be coupled at the laser tool 1344 via a line guide (not shown) with mirrors (not shown), optical fiber cables (not shown) or the like. The laser beam (not shown) may be a multipart beam and consist of a plurality of individual beams split optionally by beam splitting.

A robot control system 1327 sends a set of command signals, i.e., joint torques that the robot has to apply at each joints. The control signals are sent from the robot controller 1327 to the robot 1340 via a wired communication network 1330.

The robot 1340 can collect the information about the robot state and other data using sensing system embedded in the bracket 1381 which is then transmitted to a data input/output unit 1321 using a communication system (not shown). The collected data is passed to a system 1323 that may include the systems and methods of the present disclosure, or in addition may include an addition Lipschitz learning system or some other system associated with laser drilling operations and a controller update system 1324. Optionally, the Lipschitz learning system may only active during the initial commissioning of the robot when the learning system is estimating the Lipschitz constant for the unknown dynamics of the robotic system. Once the Lipschitz learner has estimated the Lipschitz constant, an initial conservative controller can be synthesized by the controller update system 1324 which is then sent to the robot by the robot control system 1327. The data collected during the operation of the robotic system is then fed back to the controller update system 1324 which performs an update of the controller and sends the new controller to the robot. This iterative procedure is repeated till the optimal controller is obtained for the system. In the asymptotic limit this iterative procedure designs the controller that leads to optimal performance of the robotic system and is safe during learning.

Figure 14:
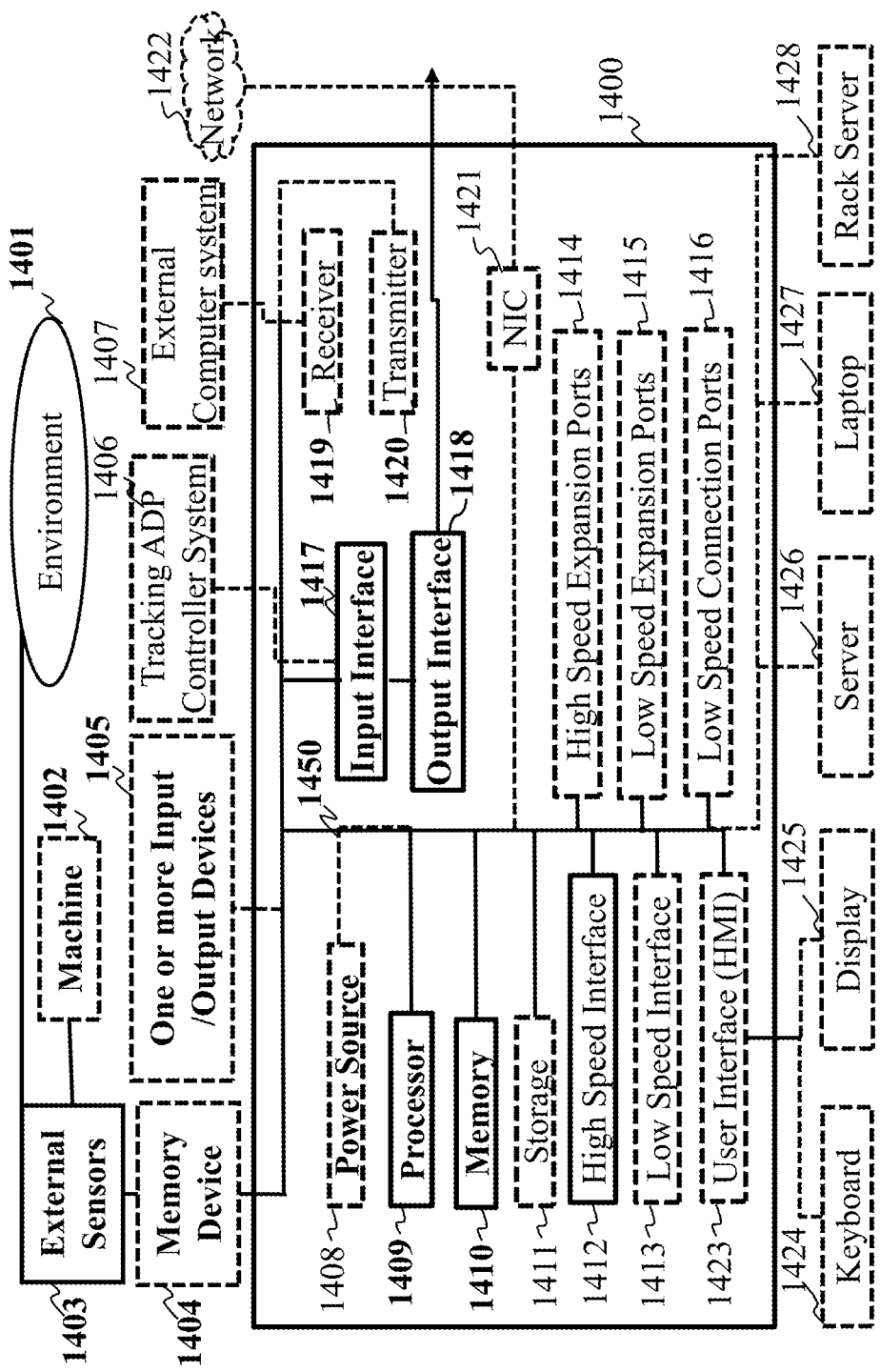
FIG. 14 is a schematic diagram illustrating an alternate centralized controller system that can be used for implementing some systems and methods, or may be combined with the centralized control system of FIG. 13A, and/or with the centralized controller system of FIG. 1C, depending on the specific goals of a user, according to some embodiments of the present disclosure.

FIG. 14 is a schematic diagram illustrating an alternate centralized controller system that can be used for implementing some methods, or may be combined with the centralized control system of FIG. 13A, and/or with the centralized controller system of FIG. 1C, depending on the specific goals of a user, according to some embodiments of the present disclosure. For example, the alternate centralized controller system can be a computing apparatus that represents various forms of digital computers, such as laptops, desktops, workstations, personal digital assistants, servers, blade servers, mainframes, and other appropriate computers.

The centralized controller system 1400 can include a power source 1408, a processor 1409, a memory 1410, a storage device 1411, all connected to a bus 1450. Further, a high-speed interface 1412, a low-speed interface 1413, high-speed expansion ports 1414 and low speed connection ports 1415, can be connected to the bus 1450. Also, a low-speed expansion port 1416 is in connection with the bus 1450. Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third party imaging device, and/or third-party printing device outside of the computer device 1400.

Contemplated is that the memory 1410 can store instructions that are executable by the centralized controller system 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1110 may also be another form of computer-readable medium, such as a magnetic or optical disk.

Still referring to FIG. 14, a storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumb-drive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above.

The system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others.

Still referring to FIG. 14, the centralized controller system 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter.

Still referring to FIG. 14, the centralized controller system 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components in a mobile device (not shown), such as a mobile computing device having different component configuration arranged for mobile devices.

Features

According to another embodiment of the present disclosure, an apparatus having a computing system for generating optimal tracking control (TC) policies for controlling a machine to track a given time-varying reference (GTVR) trajectory. The apparatus including a memory for storing data and program instructions. The data includes the GTVR trajectory, a constraint-admissible invariant set (CAIS) of machine states satisfying machine state constraints and a corresponding TC policy mapping a machine state within the CAIS to a control input satisfying control input rate constraints. A transceiver to receive data including an updated augmented state of the machine. A processor of the computing system is configured to jointly control the computing system to control the machine operation to drive an augmented state of the machine to zero, and update the CAIS and update the TC policy. Wherein, for executing the joint control, the processor is configured to control the computing system using a sequence of control inputs generated using the TC policy and a sequence of augmented machine states within the CAIS corresponding to the sequence of tracking control inputs. Execute a constrained tracking approximate dynamic programming (TADP) using the received data to update the value function, update the CAIS and the corresponding TC policy. Control the computing system using the updated TC policy, the updated CAIS and the corresponding updated value function to control the machine to track the GTVR trajectory. Wherein the following aspects below are contemplated as configuring a modified embodiment of the above embodiment for one or a combination of the following aspects below.

According to aspects of the present disclosure, At least one benefit of the aspect can be a control of the computing system to control an augmented state of the machine state within the CAIS according to the corresponding TC policy maintains the augmented machine state within the CAIS, while tracking the GTVR trajectory. Another aspect can be wherein, to execute the constrained TADP, the processor is configured to execute a constrained tracking approximate dynamic programming (TADP) using the received data to update the value function, update the CAIS and the corresponding TC policy. Wherein, to execute the constrained TADP, the processor is configured to execute a constrained policy evaluation to produce an updated CAIS and a corresponding updated value function of an augmented servomotor state. Wherein the updated value function improves a tracking cost function of the operation of the servomotor and the updated CAIS enforces satisfaction of the servomotor incremental state and incremental control input constraints, for the GTVR trajectory. Execute a constrained policy improvement to generate an updated TC policy that improves the tracking cost function of the servomotor operation according to the updated CAIS and the corresponding updated value function, for the GTVR trajectory. Execute a reference scaling operation that employs the stored data to generate a modified reference trajectory, wherein the modified reference trajectory is a reformulation of the given reference trajectory to avoid constraint violation at time instants where the given reference trajectory exhibits jump discontinuities.

Another aspect may be that the time-varying reference trajectory is a piece-wise constant reference trajectory. Such that the piece-wise constant reference trajectory is subject to machine incremental state constraints in continuous state space of the computing system, subject to incremental control input constraints in a continuous control input space of the computing system, and is subject to tracking error constraints in the continuous tracking error space of the computing system.

Another aspect may be that the GTVR trajectory is a class of time-varying reference trajectories with time-derivatives that are bounded, and these bounds are one or a combination of bounded first-order time derivatives, bounded second-order time derivatives or bounded higher-order time derivatives. Wherein the class of time-varying reference trajectories is a class of slow-in-time-varying reference trajectories. The class of slow-in-time-varying reference trajectories have some time-derivatives that are bounded and some time-derivatives that exhibit jump discontinuities at some time instants during the operation of the machine.

Another aspect may be that the augmented machine state is one or a combination of a first-order increment or difference, a second-order increment or difference or a higher-order increment or difference. Another aspect may be that the stored data includes past machine state data, differences of the past machine state data, past tracking control input data controlling the machine, and past tracking error data of the machine, such that each tracking error is a difference of a past output of the machine and a past GTVR trajectory. Another aspect may be that the constrained ADP is a constrained policy iteration. Another aspect may be that the control policy is a proportional-integral (PI) control policy, obtained by integrating or summing the stored past tracking error data of the machine.

Definitions of Terms

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Computing system: The computing system can include one or more processors for controlling operation of the computing system, and a memory for storing data and program instructions usable by the one or more processors. It is possible that the computing system can be configured to determine control inputs in accordance with apparatuses, systems and methods of the present disclosure. The computing system may also be configured for revising and/or optimizing one or more control policy usable for controlling a system, and the like. Also contemplated is that the computing system may be incorporated into a machine and configured to update/revise and optimize the control policy directed to controlling operation of the machine. The information (for example, data, instructions, and/or other information) required by the computing system to update/revise and/or optimize the control policy may be received from and/or obtained by any suitable venues, for example, from machine sensors or from other machine resources such as an external databases via a wireless connection. At least some of the information (for example, data) required by the computing system to update/revise and/or optimize the control policy may be provided to the computing system (for example, as data or other information stored in a memory or memories) prior to operation of the machine. The computing system may also be configured to control the machine in accordance with the updated/revised or optimized control policy, to perform the machine operation. The optimized or updated/revised control policy generated by the remote computing system may then be loaded or installed into a machine computing system for deployment with the machine, to control the machine during operation.

Servomotor: A servomotor can be a rotary actuator or linear actuator that allows for precise control of angular or linear position, velocity and acceleration. The servomotor can include of a suitable motor coupled to a sensor for position feedback. The servomotor also requires a relatively sophisticated controller, often a dedicated module designed specifically for use with servomotors. Servomotors are not a specific class of motor, although the term servomotor is often used to refer to a motor suitable for use in a closed-loop control system. The servomotors can be used in applications such as a servomotor that positions the head of a laser drilling machine, robotics, CNC machinery or automated manufacturing. For example, the mechanics of a servomotor is a closed-loop servomechanism that uses position feedback to control its motion and final position. The input to its control is a signal (either analogue or digital) representing the position commanded for the output shaft. The motor can be paired with some type of position encoder to provide position and speed feedback. In the simplest case, only the position is measured. The measured position of the output is compared to the command position, the external input to the controller. If the output position differs from that required, an error signal is generated which then causes the motor to rotate in either direction, as needed to bring the output shaft to the appropriate position. As the positions approach, the error signal reduces to zero and the motor stops.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Although the present disclosure has been described with reference to certain preferred embodiments, it is to be understood that various other adaptations and modifications can be made within the spirit and scope of the present disclosure.

What is claimed is:

1. An apparatus having a computing system for generating optimal tracking control (TC) policies for controlling a machine having machine uncertainties to track a given time-varying reference (GTVR) trajectory, comprising:
    a memory for storing data and program instructions, the data includes the GTVR trajectory, a constraint-admissible invariant set (CAIS) of machine states satisfying machine state constraints and a corresponding TC policy mapping a machine state within the CAIS to a control input satisfying control input rate constraints;
    a transceiver to receive data including an updated augmented state of the machine; and
    a processor of the computing system is configured to jointly control the computing system to control the machine operation to drive an augmented state of the machine, and update the CAIS and the corresponding TC policy, wherein, for executing the joint control, the processor is configured to
        control the computing system using a sequence of control inputs generated using the corresponding TC policy and a sequence of augmented machine states within the CAIS corresponding to the sequence of control inputs;
        execute a constrained tracking approximate dynamic program (TADP) using the received data to update the value function, update the CAIS and the corresponding TC policy, wherein the TADP is executed based on history of each of the augmented state of the machine and the corresponding TC policy; and
        control the computing system using the updated TC policy, the updated CAIS and the corresponding updated value function to control the machine to track the GTVR trajectory, wherein the computing system is controlled to track the GTVR trajectory based on an optimal linear quadratic tracking controller.

2. The apparatus of claim 1, wherein the machine uncertainties are uncertainties caused by one or a combination of compressibility of fluids within the machine or friction forces caused by one or more components of the machine.

3. The apparatus of claim 1, wherein the control of the computing system to control the augmented state of the machine within the CAIS according to the corresponding TC policy maintains the augmented state of the machine state within the CAIS, while tracking the GTVR trajectory.

4. The apparatus of claim 1, wherein, to execute the constrained TADP, the processor is configured to:
    execute a constrained tracking approximate dynamic program (TADP) using the received data to update the value function, update the CAIS and the corresponding TC policy, wherein, to execute the constrained TADP, the processor is configured to:
        execute a constrained policy evaluation to produce the updated CAIS and a corresponding updated value function of an augmented servomotor state, wherein the updated value function improves a tracking cost function of the operation of a servomotor and the updated CAIS enforces satisfaction of a servomotor incremental state and incremental control input constraints, for the GTVR trajectory;
        execute a constrained policy improvement to generate the updated TC policy that improves the tracking cost function of a servomotor operation according to the updated CAIS and the corresponding updated value function, for the GTVR trajectory; and
        execute a reference scaling operation that employs the stored data to generate a modified reference trajectory, wherein the modified reference trajectory is a reformulation of the GTVR trajectory to avoid constraint violation at time instants where the GTVR trajectory exhibits jump discontinuities.

5. The apparatus of claim 1, wherein the GTVR trajectory is a piece-wise constant reference trajectory, such that the piece-wise constant reference trajectory is subject to machine incremental state constraints in continuous state space of the computing system, subject to incremental control input constraints in a continuous control input space of the computing system, and is subject to tracking error constraints in the continuous tracking error space of the computing system.

6. The apparatus of claim 1, wherein the GTVR trajectory is a class of time-varying reference trajectories with time-derivatives that are bounded, and these bounds are one or a combination of bounded first-order time derivatives, bounded second-order time derivatives or bounded higher-order time derivatives.

7. The apparatus of claim 6, wherein the class of time-varying reference trajectories is a class of slow-in-time-varying reference trajectories, the class of slow-in-time-varying reference trajectories have some time-derivatives that are bounded and some time-derivatives that exhibit jump discontinuities at some time instants during the machine operation.

8. The apparatus of claim 1, wherein the augmented state of the machine is one or a combination of a first-order increment or difference, a second-order increment or difference or a higher-order increment or difference.

9. The apparatus of claim 1, wherein the stored data includes past machine state data, differences of the past machine state data, past tracking control input data controlling the machine, and past tracking error data of the machine, such that each tracking error is a difference of a past output of the machine and a past GTVR trajectory.

10. The apparatus of claim 1, wherein the constrained ADP is a constrained policy iteration.

11. The apparatus of claim 1, wherein
    the stored data further includes past tracking error data of the machine, and the control policy is a proportional-integral (PI) control policy, obtained by integrating or summing the stored past tracking error data of the machine.

12. A computing system for generating optimal tracking control (TC) policies for controlling a machine having machine uncertainties to track a given time-varying reference (GTVR) trajectory, comprising:
- a memory for storing data and program instructions, the data includes the GTVR trajectory, a constraint-admissible invariant set (CAIS) of machine states satisfying machine state constraints and a corresponding TC policy mapping a machine state within the CAIS to a control input satisfying control input rate constraints;
- a transceiver to receive data including an updated augmented state of the machine; and
- a processor of the computing system is configured to jointly control the computing system to control the machine operation to drive an augmented state of the machine, and update the CAIS and the corresponding TC policy, wherein, for executing the joint control, the processor is configured to
  - control the computing system using a sequence of control inputs generated using the corresponding TC policy and a sequence of augmented machine states within the CAIS corresponding to the sequence of control inputs; and
  - execute a constrained tracking approximate dynamic program (TADP) using the received data to update the value function, update the CAIS and the corresponding TC policy, wherein the TADP is executed based on history of each of the augmented state of the machine and the corresponding TC policy; and
  - control the computing system using the updated TC policy, the updated CAIS and the corresponding updated value function to control the machine to track the GTVR trajectory, wherein the computing system is controlled to track the GTVR trajectory based on an optimal linear quadratic tracking controller.

13. The system of claim 12, wherein a control of the computing system to control the augmented state of the machine within the CAIS according to the corresponding TC policy maintains the augmented state of the machine within the CAIS, while tracking the GTVR trajectory.

14. The system of claim 12, wherein, to execute the constrained TADP, the processor is configured to:
- execute a constrained policy evaluation to produce the updated CAIS and the corresponding updated value function of the augmented state of the machine, wherein the updated value function improves a tracking cost function of the operation of the machine and the updated CAIS enforces satisfaction of the augmented state of the machine and incremental control input constraints, for the GTVR trajectory;
- execute a constrained policy improvement to generate the updated TC policy that improves the tracking cost function of the machine operation according to the updated CAIS and the corresponding updated value function, for the GTVR trajectory; and
- execute a reference scaling operation that employs the stored data to generate a modified reference trajectory, wherein the modified reference trajectory is a reformulation of the GTVR trajectory to avoid constraint violation at time instants where the GTVR trajectory exhibits jump discontinuities.

15. A method having a computing system for generating optimal tracking control (TC) policies for controlling a machine having machine uncertainties to track a given time-varying reference (GTVR) trajectory, comprising:
- storing data and program instructions in a memory, the data includes the GTVR trajectory, a constraint-admissible invariant set (CAIS) of machine states satisfying machine state constraints and a corresponding TC policy mapping a machine state within the CAIS to a control input satisfying control input rate constraints;
- receiving data via a transceiver, the data including an updated augmented state of the machine; and
- using a processor of the computing system to jointly control the computing system to control the machine operation to drive an augmented state of the machine, and update the CAIS and the corresponding TC policy, wherein, for executing the joint control, the processor is configured for
- controlling the computing system using a sequence of control inputs generated using the corresponding TC policy and a sequence of augmented machine states within the CAIS corresponding to the sequence of control inputs; and
- executing a constrained tracking approximate dynamic program (TADP) using the received data to update the value function, update the CAIS and the corresponding TC policy, wherein the TADP is executed based on history of each of the augmented state of the machine and the corresponding TC policy; and
- control the computing system using the updated TC policy, the updated CAIS and the corresponding updated value function to control the machine to track the GTVR trajectory, wherein the computing system is controlled to track the GTVR trajectory based on an optimal linear quadratic tracking controller.

16. The method of claim 15, wherein a control of the computing system to control an augmented state of the machine within the CAIS according to the corresponding TC policy maintains the augmented state of the machine within the CAIS, while tracking the GTVR trajectory.

17. The method of claim 15, wherein, to execute the constrained TADP, the processor is configured to:
- execute the TADP using the received data to update the value function, update the CAIS and the corresponding TC policy, wherein, to execute the constrained TADP, the processor is configured to:
  - execute a constrained policy evaluation to produce the updated CAIS and the corresponding updated value function of an augmented servomotor state, wherein the updated value function improves a tracking cost function of the operation of a servomotor and the updated CAIS enforces satisfaction of the augmented servomotor state and incremental control input constraints, for the GTVR trajectory;
  - execute a constrained policy improvement to generate the updated TC policy that improves the tracking cost function of a servomotor operation according to the updated CAIS and the corresponding updated value function, for the GTVR trajectory; and
  - execute a reference scaling operation that employs the stored data to generate a modified reference trajectory, wherein the modified reference trajectory is a reformulation of the GTVR trajectory to avoid constraint violation at time instants where the GTVR trajectory exhibits jump discontinuities.

18. An apparatus having a computing system for generating optimal tracking control (TC) policies for controlling a servomotor having servomotor uncertainties to track a given time-varying reference (GTVR) trajectory, comprising:
- a memory for storing data and program instructions, the data includes the GTVR trajectory, a constraint-admissible invariant set (CAIS) of servomotor states and tracking errors, the CAIS satisfies servomotor state constraints and a corresponding TC policy mapping a servomotor state within the CAIS to a control input satisfying control input constraints, wherein a control of the computing system to control an augmented servomotor state within the CAIS according to the corresponding TC policy maintains the augmented servomotor state within the CAIS, while tracking the GTVR trajectory;
- a transceiver to receive data including an updated augmented state of the servomotor that includes a difference between updated states of the servomotor and the servomotor states and the tracking error from the memory; and
- a processor of the computing system is configured to jointly control the computing system to control a servomotor operation to drive the augmented servomotor state, update the CAIS and the corresponding TC policy, wherein, for executing the joint control, the processor is configured to
  - control the computing system using the including a sequence of control inputs generated using the corresponding TC policy and a sequence of augmented servomotor states within the CAIS corresponding to the sequence of tracking control inputs; and
  - execute a constrained tracking approximate dynamic program (TADP) using the received data to update the value function, update the CAIS and the corresponding TC policy, wherein, to execute the constrained TADP, the processor is configured to:
    - execute a constrained policy evaluation to produce an updated CAIS and a corresponding updated value function of the augmented servomotor state, wherein the updated value function improves a tracking cost function of the operation of the servomotor and the updated CAIS enforces satisfaction of the augmented servomotor state and incremental control input constraints, for the GTVR trajectory;
    - execute a constrained policy improvement to generate an updated TC policy that improves the tracking cost function of the servomotor operation according to the updated CAIS and the corresponding updated value function, for the GTVR trajectory, wherein the constrained policy improvement is executed based on history of each of the augmented servomotor state and the corresponding TC policy;
    - execute a reference scaling operation that employs the stored data to generate a modified reference trajectory, wherein the modified reference trajectory is a reformulation of the GTVR trajectory to avoid constraint violation at time instants where the GTVR trajectory exhibits jump discontinuities; and
    - control the computing system using the updated TC policy and the updated CAIS and the corresponding updated value function to control the servomotor to track the GTVR trajectory, wherein the computing system is controlled to track the GTVR trajectory based on an optimal linear quadratic tracking controller.

19. The apparatus of claim 18, wherein the servomotor uncertainties are uncertainties caused by one or a combination of compressibility of fluids within the servomotor or friction forces caused by one or more components of the servomotor.

20. The apparatus of claim 18, wherein
the stored data further includes past tracking error data of the machine, and
the control policy is a proportional-integral (PI) control policy, obtained by integrating or summing the stored past tracking error data of the machine.

* * * * *